(12) United States Patent
Park et al.

(10) Patent No.: US 11,050,056 B2
(45) Date of Patent: Jun. 29, 2021

(54) NEGATIVE ACTIVE MATERIAL FOR SECONDARY BATTERY AND SECONDARY BATTERY INCLUDING THE SAME

(71) Applicant: ILJIN ELECTRIC CO., LTD., Hwaseong (KR)

(72) Inventors: Cheol Ho Park, Suwon (KR); Seon Kyong Kim, Seoul (KR); Min Hyun Kim, Seoul (KR)

(73) Assignee: ILJIN ELECTRIC CO., LTD., Hwaseong-si (KR)

( * ) Notice: Subject to any disclaimer, the term of this patent is extended or adjusted under 35 U.S.C. 154(b) by 186 days.

(21) Appl. No.: 16/347,413

(22) PCT Filed: Nov. 13, 2017

(86) PCT No.: PCT/KR2017/012765
§ 371 (c)(1),
(2) Date: May 3, 2019

(87) PCT Pub. No.: WO2018/117419
PCT Pub. Date: Jun. 28, 2018

(65) Prior Publication Data
US 2019/0312271 A1    Oct. 10, 2019

(30) Foreign Application Priority Data
Dec. 21, 2016    (KR) .................. 10-2016-0176102

(51) Int. Cl.
*H01M 4/00* (2006.01)
*H01M 4/38* (2006.01)
*H01M 4/04* (2006.01)
*H01M 4/134* (2010.01)
*H01M 10/0525* (2010.01)
*H01M 4/02* (2006.01)

(52) U.S. Cl.
CPC ......... *H01M 4/386* (2013.01); *H01M 4/0471* (2013.01); *H01M 4/134* (2013.01); *H01M 4/38* (2013.01); *H01M 10/0525* (2013.01); *H01M 2004/021* (2013.01); *H01M 2004/027* (2013.01)

(58) Field of Classification Search
CPC ........... H01M 2004/021; H01M 4/386; H01M 10/0525; H01M 4/134; H01M 4/0471; H01M 4/38; H01M 2004/027; Y02E 60/10
See application file for complete search history.

(56) References Cited

U.S. PATENT DOCUMENTS

2017/0338490 A1*  11/2017  Xiao .................. H01M 4/628

FOREIGN PATENT DOCUMENTS

JP        2016-100329 A      5/2016
KR    10-2016-0085382 A      7/2016
(Continued)

*Primary Examiner* — Cynthia H Kelly
*Assistant Examiner* — Monique M Wills
(74) *Attorney, Agent, or Firm* — Patent Office of Chung Park

(57) ABSTRACT

The present invention relates to a negative electrode active material for a secondary battery, including: a Si main phase formed of crystalline Si; and a matrix coexisting with the Si main phase, in which at least a part of the matrix has a crystal lattice parameter which is any one among n times, 1/n time, n√2 times, n/√2 times, and n√5 times of a crystal lattice parameter of the Si main phase (n is an integer).

19 Claims, 13 Drawing Sheets

Si/Matrix = INCOHERENT INTERFACE

(56) References Cited

FOREIGN PATENT DOCUMENTS

| | | |
|---|---|---|
| KR | 10-2016-0085383 A | 7/2016 |
| KR | 10-2016-0104827 A | 9/2016 |
| KR | 10-2016-0150576 A | 12/2016 |
| KR | 10-2016-0150577 A | 12/2016 |
| WO | WO2016111468 A1 | 7/2016 |

* cited by examiner

[FIG. 1A]
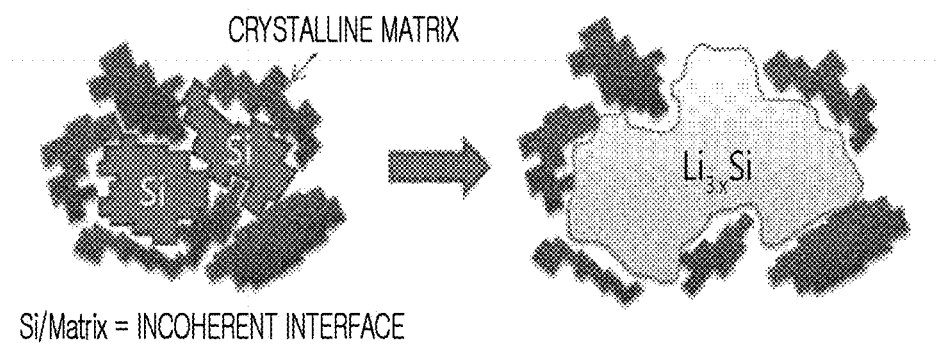
Si/Matrix = INCOHERENT INTERFACE
[FIG. 1B]
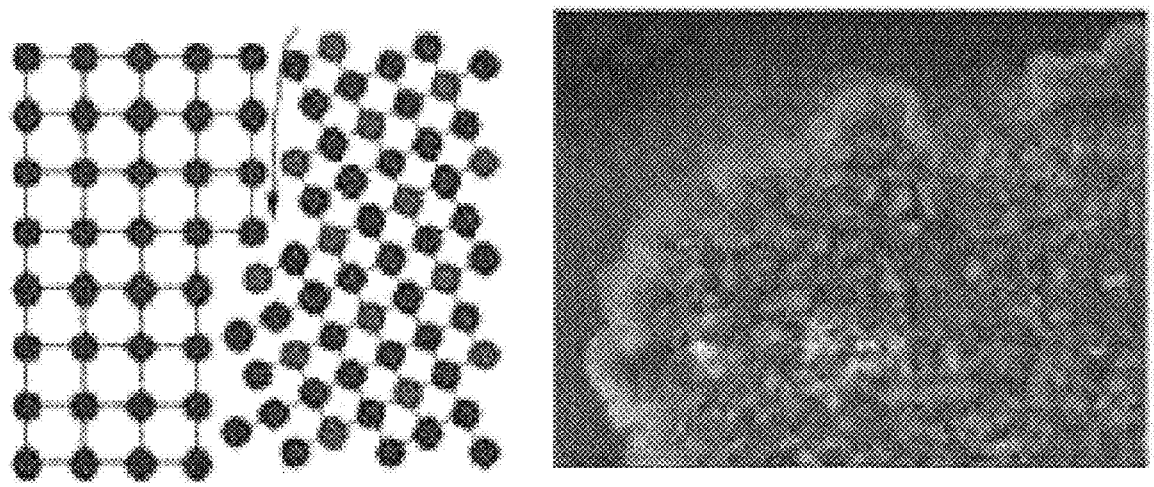

[FIG. 2A]
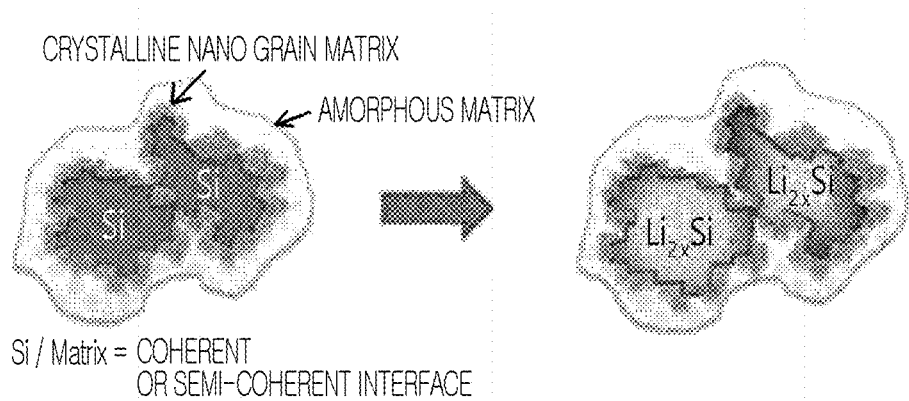
[FIG. 2B]
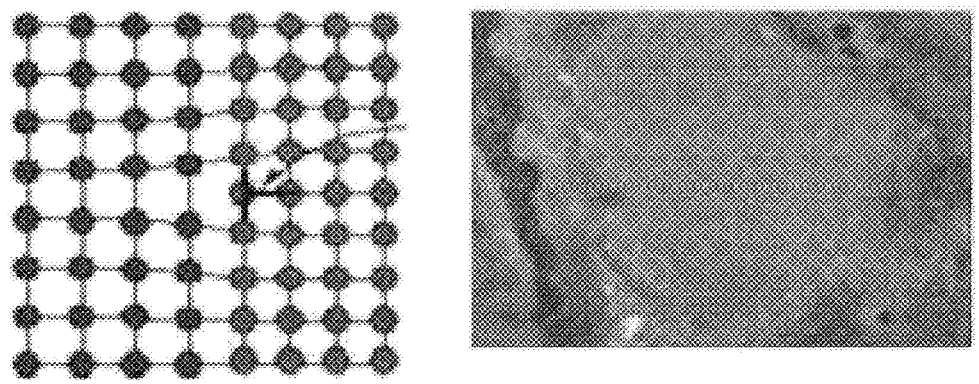

[FIG. 3A]
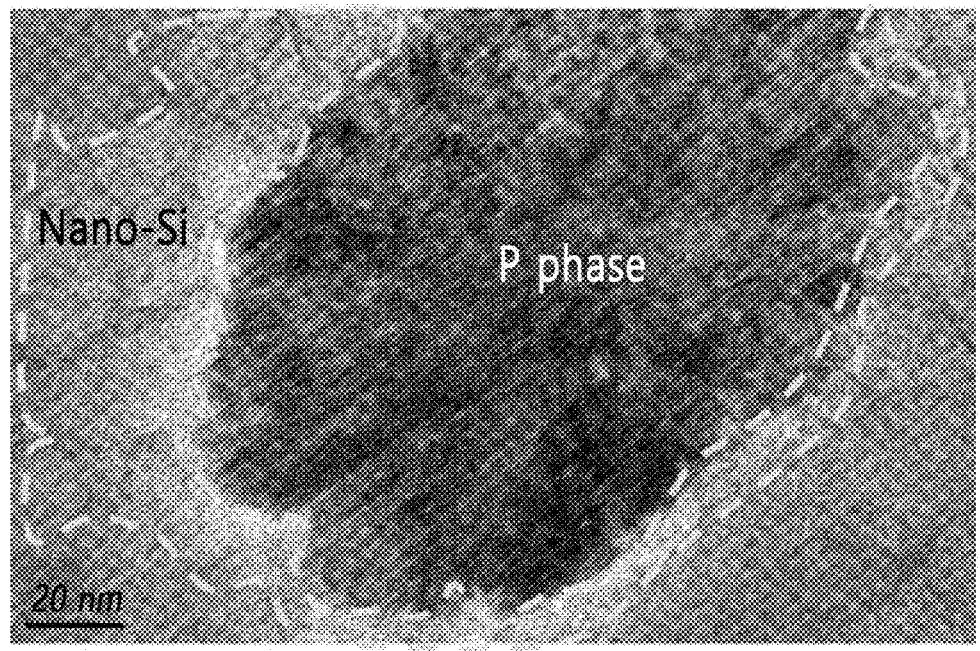
[FIG. 3B]
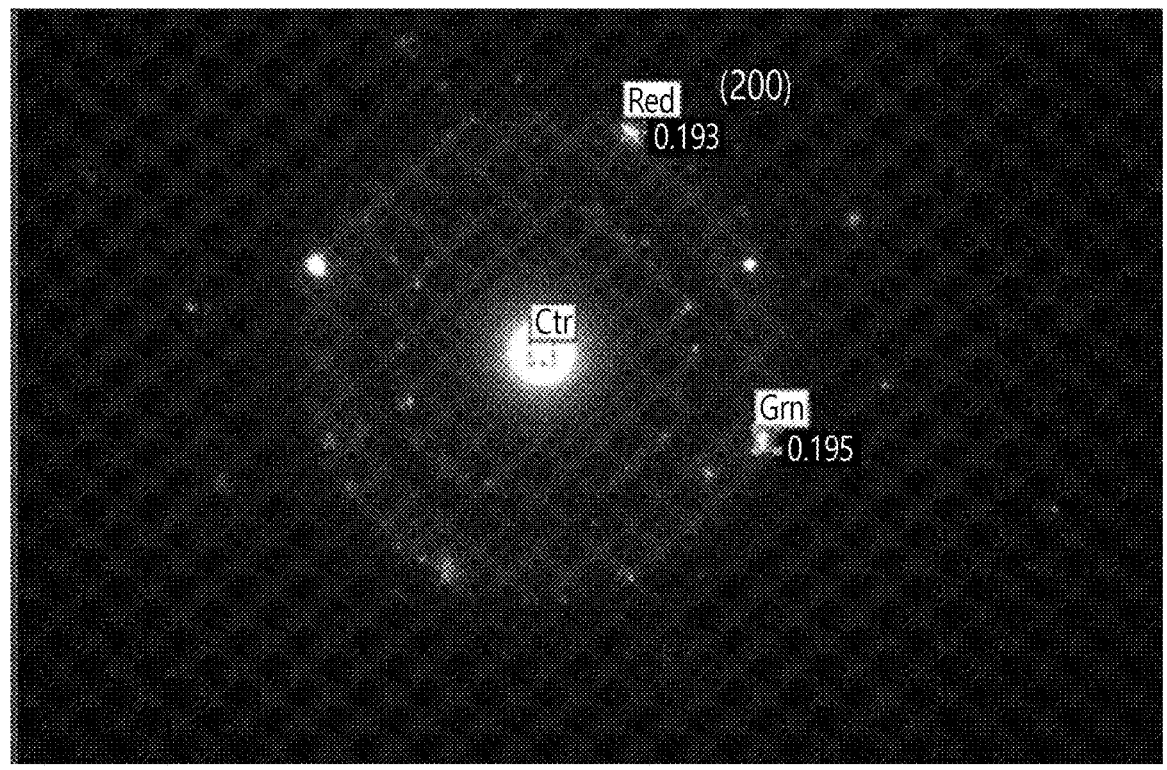

[FIG. 3C]
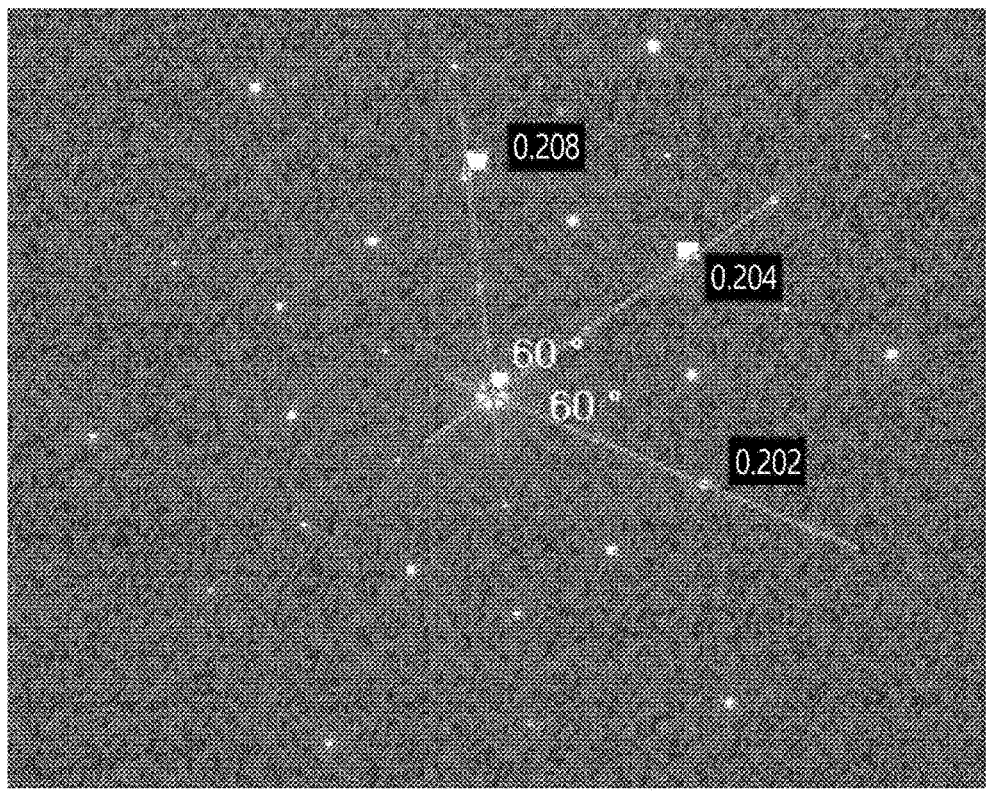
[FIG. 4A]
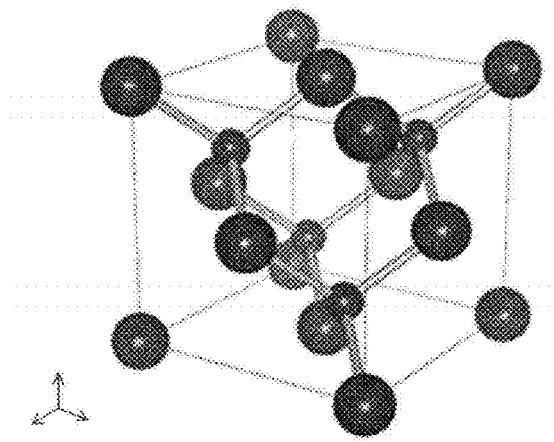

[FIG. 4B]
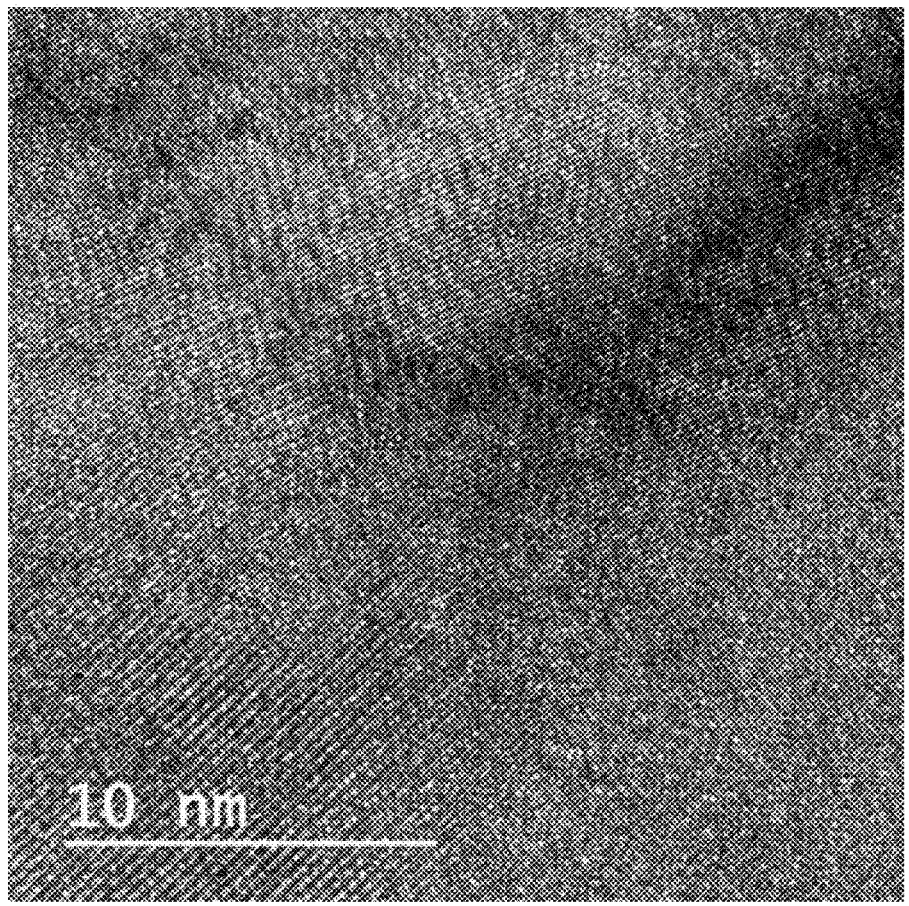
[FIG. 5A]
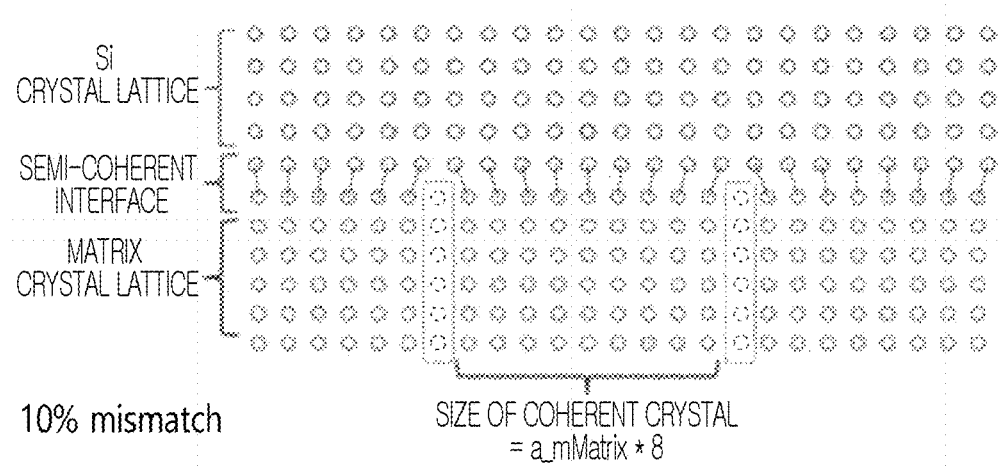

[FIG. 5B]
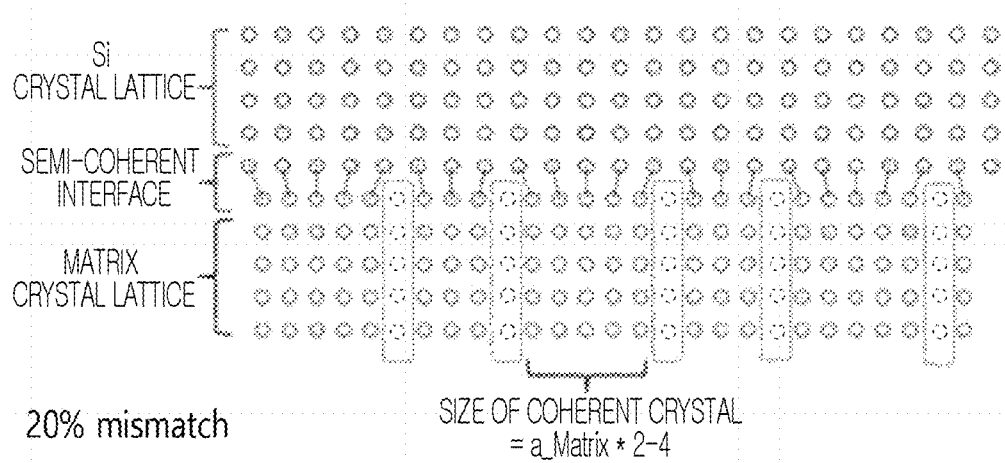
[FIG. 5C]
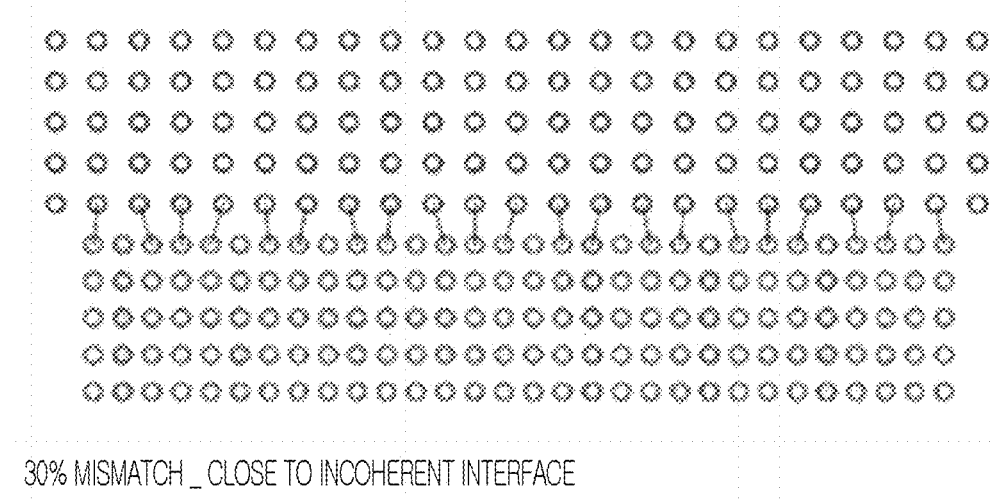

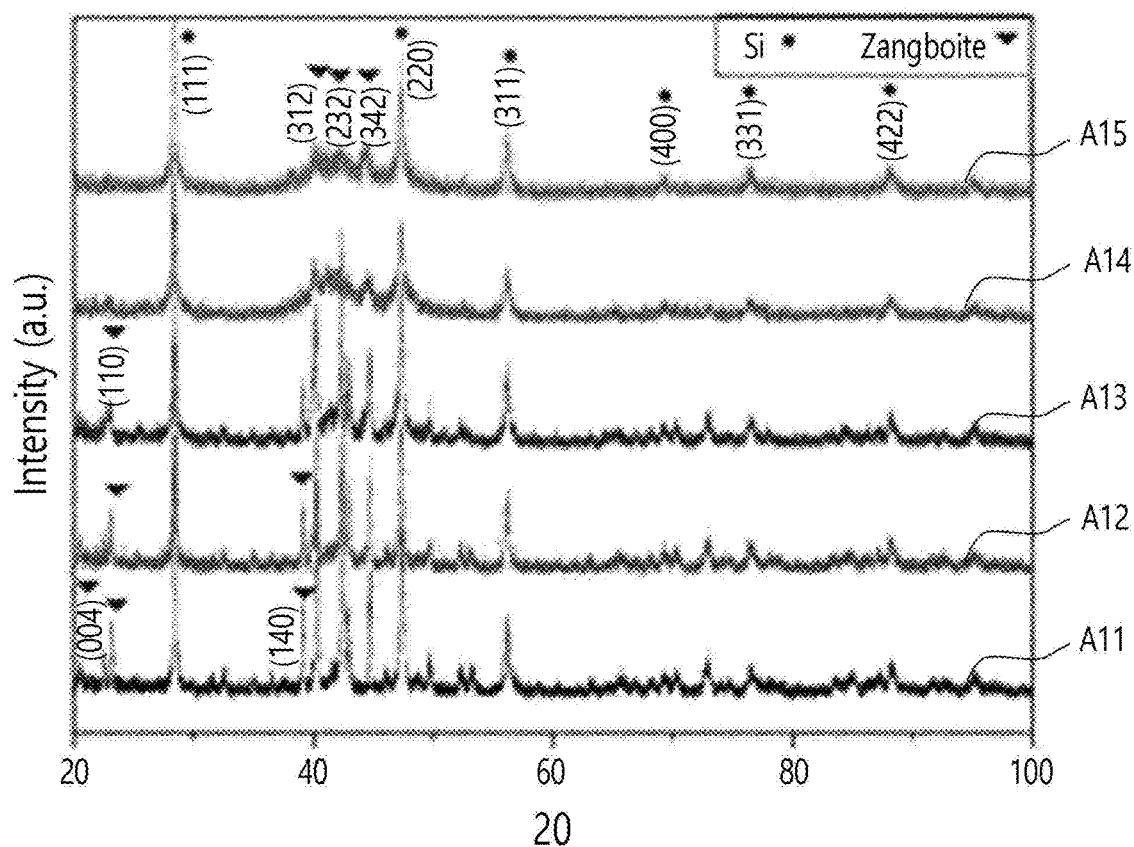
[FIG. 6A]

[FIG. 6B]
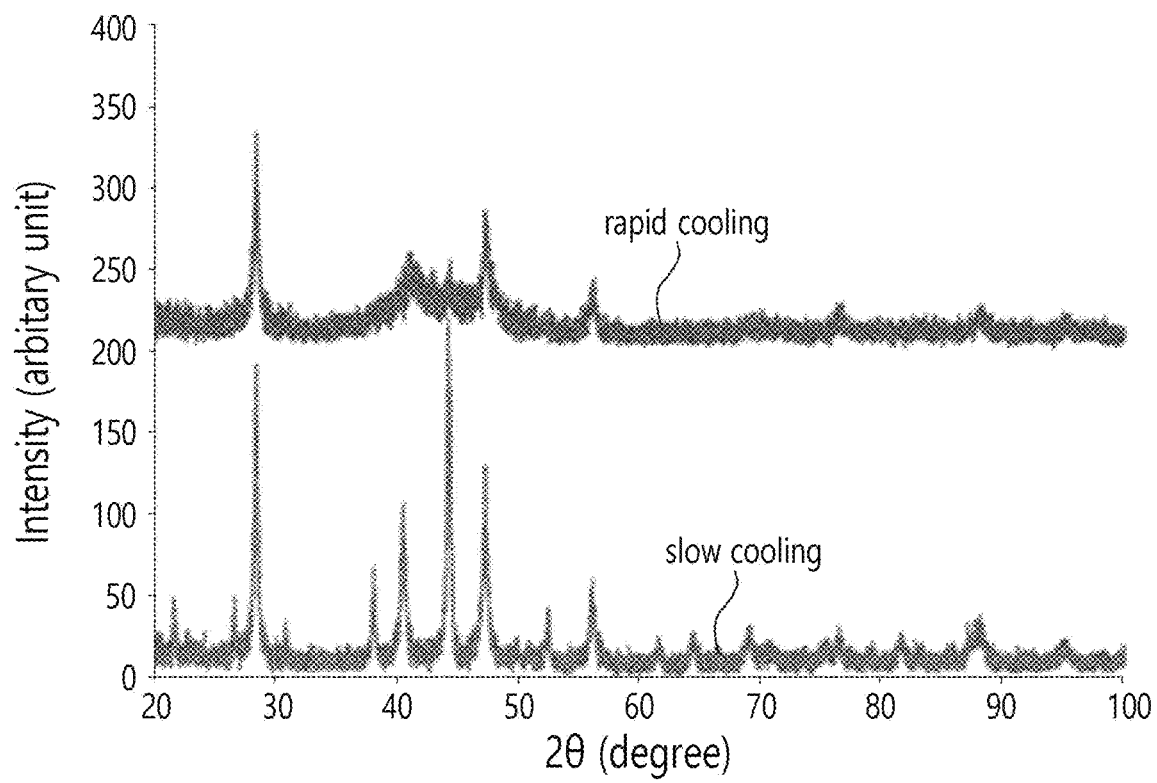
[FIG. 6C]
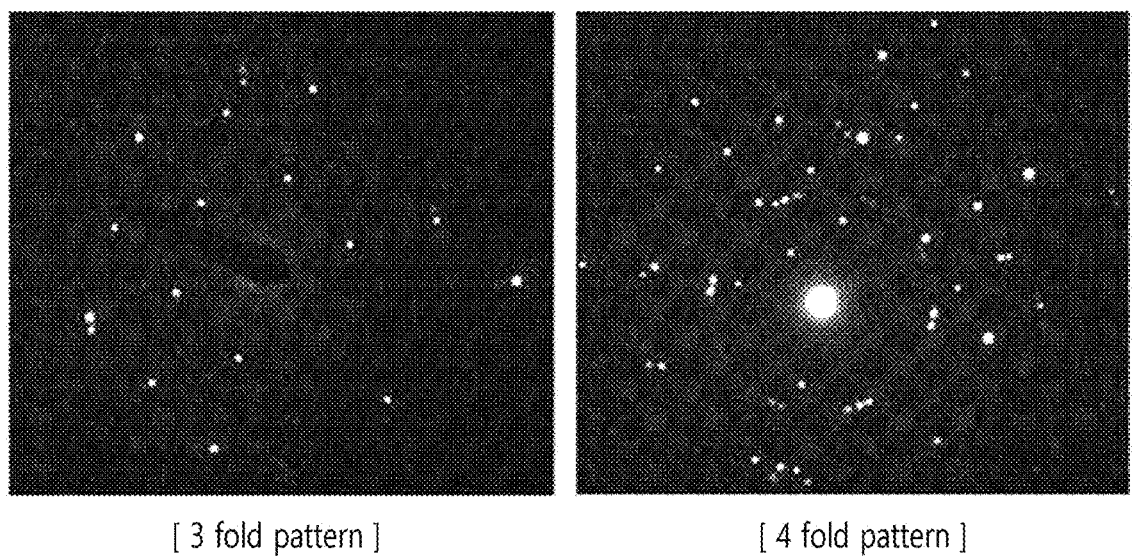
[ 3 fold pattern ]    [ 4 fold pattern ]

[FIG. 7A]
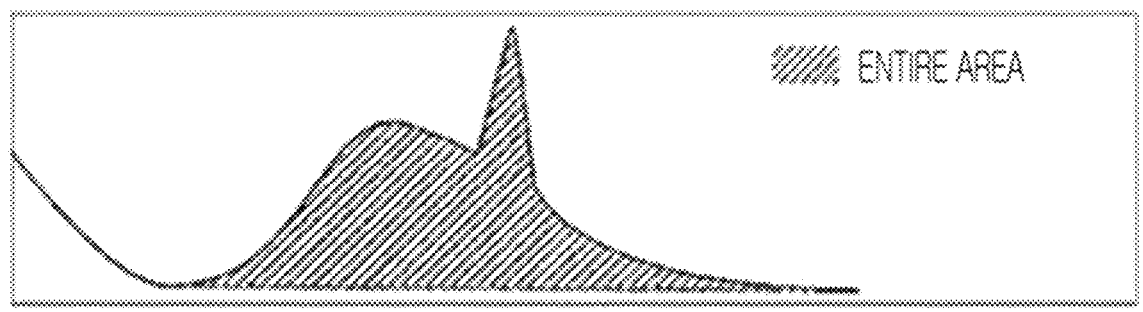
[FIG. 7B]
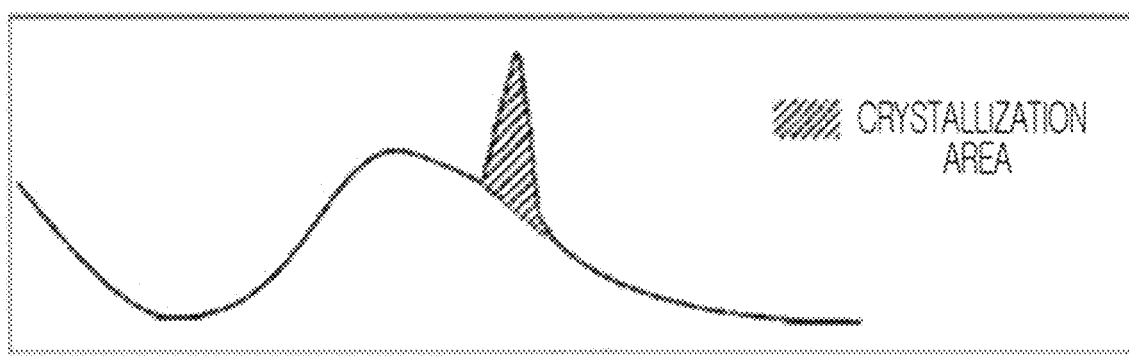

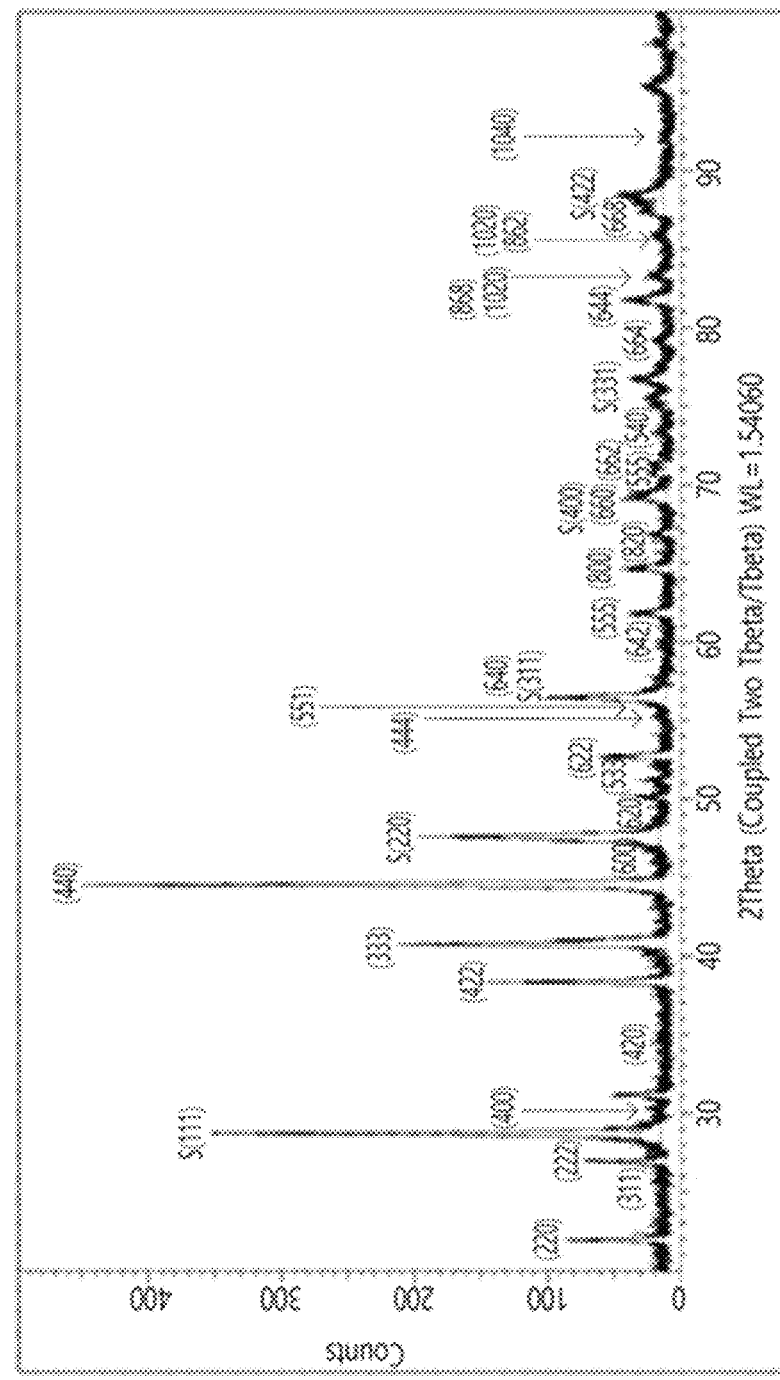
[FIG. 8]

[FIG. 9]
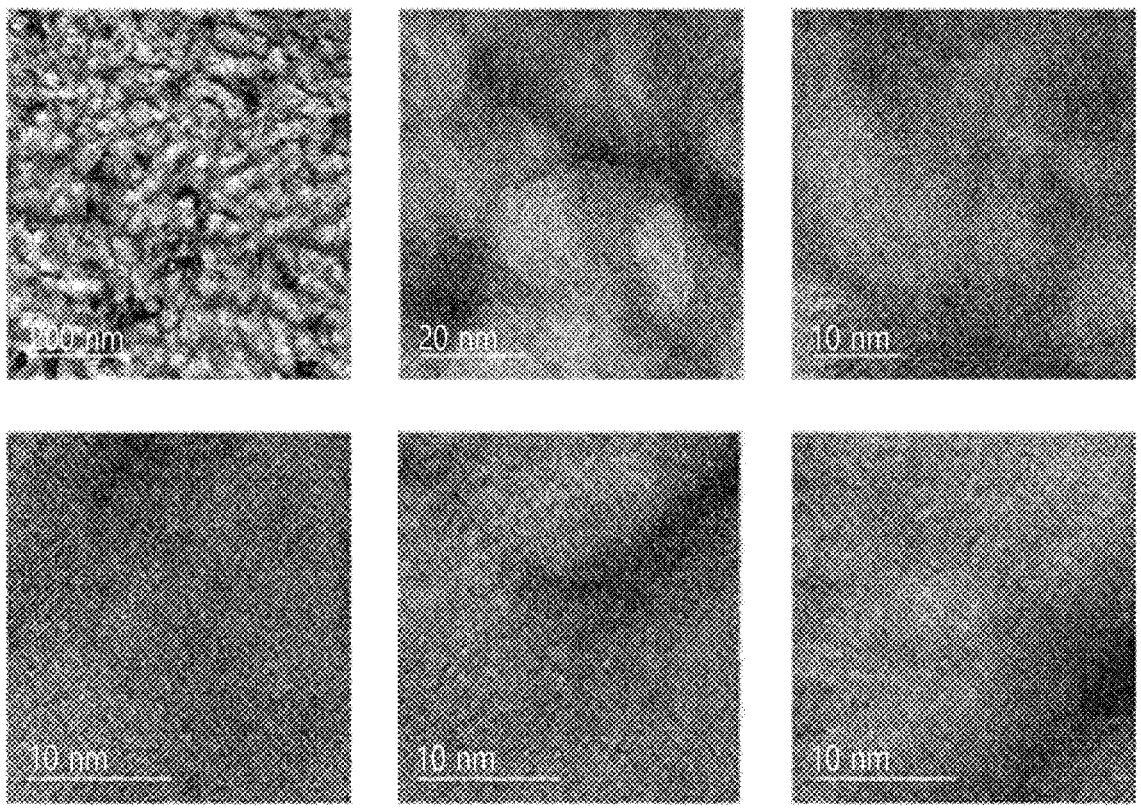
[FIG. 10A]
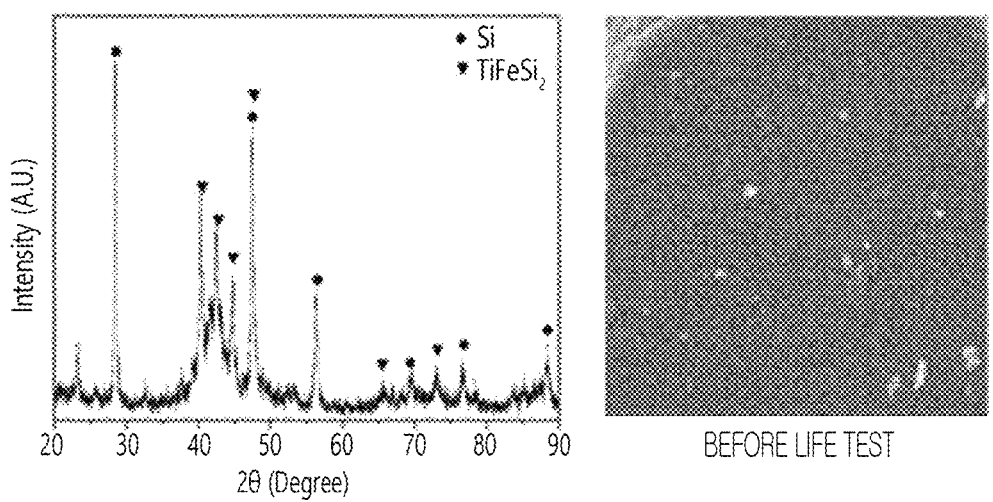
BEFORE LIFE TEST

[FIG. 10B]
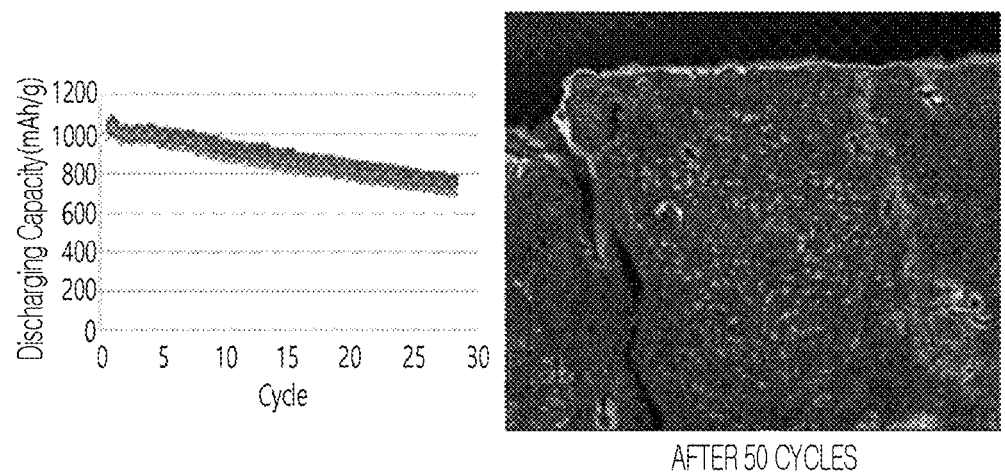
[FIG. 11A]
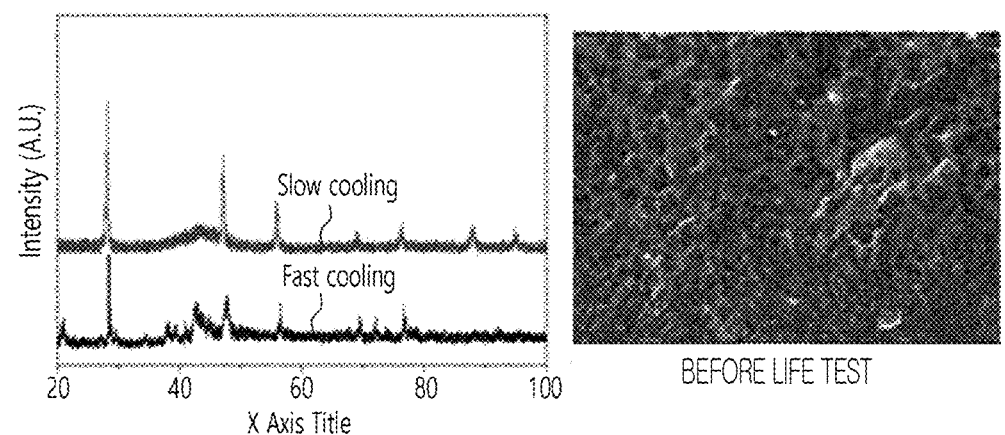
[FIG. 11B]
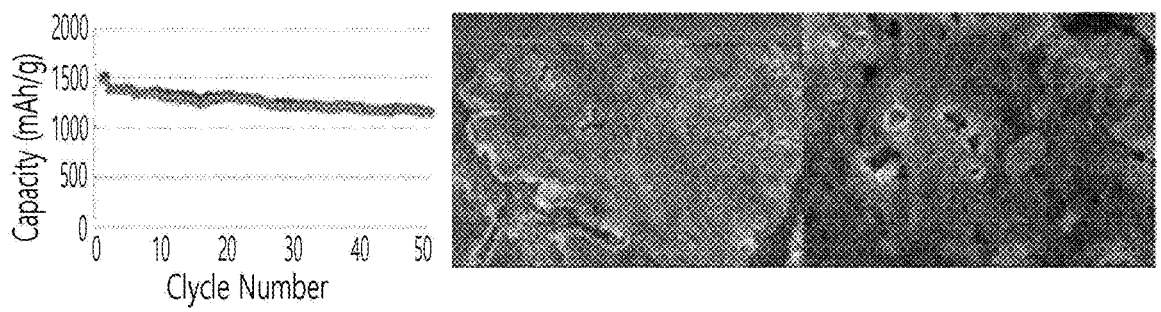

[FIG. 12A]
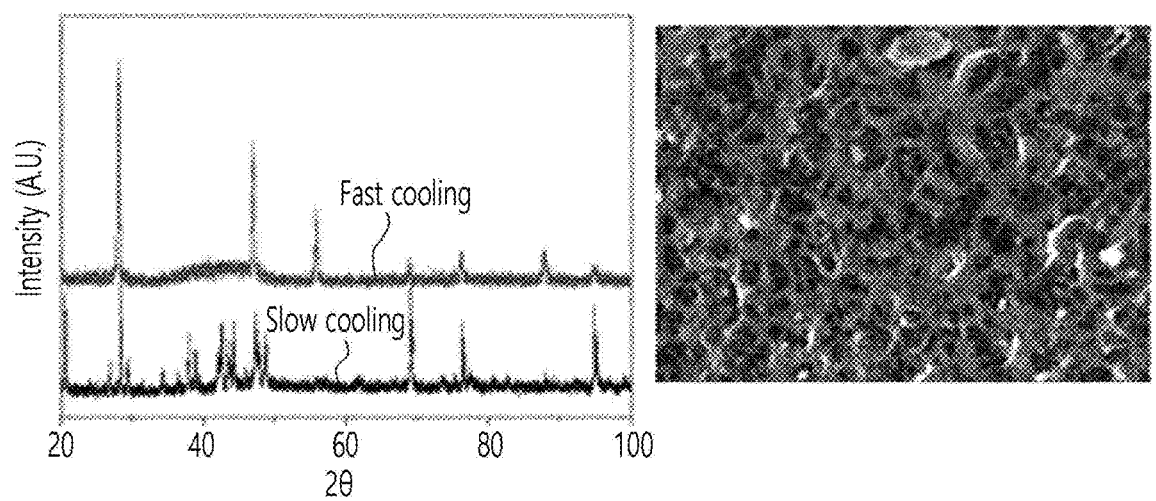
[FIG. 12B]

NEGATIVE ACTIVE MATERIAL FOR SECONDARY BATTERY AND SECONDARY BATTERY INCLUDING THE SAME

CROSS-REFERENCE TO PRIOR APPLICATIONS

This application is a national Stage Patent Application of PCT International Patent Application No. PCT/KR2017/012765, filed on Nov. 13, 2017 under 35 U.S.C. § 371, which claims priority of Korean Patent Application No. 10-2016-0176102, filed on Dec. 21, 2016, which are all hereby incorporated by reference in their entirety.

TECHNICAL FIELD

An exemplary embodiment of the present invention relates to a negative electrode active material for a secondary battery and a secondary battery, and more particularly, to a negative electrode active material for a secondary battery having a new structure, and a secondary battery of which reliability and stability characteristics are improved by the same.

BACKGROUND ART

A lithium ion secondary battery is a reversibly chargeable/dischargeable battery, and lithium (ions) generated in a positive electrode active material is transferred to a negative electrode active material through an electrolyte and is intercalated into a layer structure of the negative electrode active material during charging and is deintercalated in the negative electrode active material during discharging, which may be repeatedly performed.

In general, a lithium compound is used as the positive electrode active material of the lithium ion secondary battery, and a carbon-based material is mainly used as the negative electrode active material. The carbon-based material includes crystalline carbon, such as graphite and artificial graphite, and amorphous carbon, such as soft carbon and hard carbon. However, the amorphous carbon has large capacity, but has a problem in irreversibility is large during the process of charging/discharging a secondary battery. Further, as the crystalline carbon, graphite is representatively used and has a theoretical marginal capacity of 372 mA h/g, which is a large capacity and is an advantage. However, even though theoretical capacity of the graphite or the carbon-based active material is somewhat large, the theoretical capacity is simply about 372 mAh/g, so that there is a problem in that the graphite or the carbon-based active material is not appropriate to be used as the negative electrode active material when a high-capacity lithium ion secondary battery is developed in the future.

In order to solve the problem, a currently actively studied material is a metal-based or intermetallic compound-based negative electrode active material. For example, a lithium ion secondary battery using a metal, such as aluminum, germanium, silicon, tin, zinc, and lead, or a semimetal as a negative electrode active material is variously studied. The materials have high capacities and high energy density, and are capable of occluding and discharging more lithium ions than that of the negative electrode active material using the carbon-based material, so that it is possible to manufacture a battery having a high capacity and high energy density. For example, it is known that pure silicon has high theoretical capacity of 4,017 mAh/g.

In the meantime, the use of the metal or the semimetal material as the negative electrode active material decreases a cycle characteristic, compared to the carbon-based material, to be an obstacle to practical use. For example, the reason is that in a lithium ion secondary battery using a metal or semimetal material as a negative electrode active material, a volume of the negative electrode active material is changed in the charging/discharging process, and thus conductivity between the negative electrode active materials is degraded, or the negative electrode active material is peeled from a negative electrode current collector.

Particularly, when silicon is used as the negative electrode active material, the silicon occludes lithium by the charging to be volume expanded by about 300% to 400%, and when the battery is discharged, lithium is discharged, so that the silicon is contracted. When the charging/discharging cycle is repeated, electric insulation may be generated due to a crack of the negative electrode active material, and life of the battery is rapidly decreased, so that there is a problem in that silicon is used in the lithium ion secondary battery.

In order to solve the problem, lots of research have been conducted for improving stability of a charging/discharging cycle by controlling a reaction speed through an adjustment of a contact reaction area between silicon and lithium ions and concentrations of silicon and lithium ions by reforming a surface of silicon and thin film coating, a metal alloy and dispersion, and partially coating with an inert material, such as deposition of diamond like carbon (DLC) or carbon having low reactivity with silicon. However, a thin film generated by physical deposition or chemical deposition that is a vacuum process exhibits high charging/discharging cycle efficiency, but when a thickness of the thin film is large, degradation due to an increase in electric resistance and dispersion resistance of lithium ions are increased, thereby rapidly decreasing an electrochemical characteristic.

In addition, a technology for producing a negative electrode active material which enables a lithium ion secondary battery to have a high capacity, such as a technology of mixing silicon and a carbon-based material, such as graphite, or coating silicon with the carbon-based material and a technology for alloying silicon and various metals, has been researched, but there is a problem in that silicon is practically used as the negative electrode active material for a lithium ion secondary battery due to a decrease in conductivity, degradation of battery performance, and the like according to the continuous charging/discharging.

DISCLOSURE

Technical Problem

An object of the present invention is to provide a silicon-based a negative electrode active material, and particularly, a negative electrode active material for a secondary battery, in which a lattice mismatch ratio of a matrix coexisting with silicon to the crystalline silicon is decreased.

Another object of the present invention is to provide a negative electrode active material for a secondary battery, which has a three-layer structure and a two-layer structure including silicon, thereby suppressing cracking due to a scattering phenomenon of a negative electrode active material during charging/discharging by the structures.

Another object of the present invention is to provide a negative electrode active material for a lithium ion secondary battery, which has little change in volume during charging/discharging, so that electrical insulation does not occur well, and which has excellent initial efficiency and an excellent capacity maintenance characteristic, and a secondary battery using the same.

Technical Solution

According to one aspect of the present invention, exemplary embodiments of the present invention provide a negative electrode active material for a secondary battery, including: a Si main phase formed of crystalline Si; and a matrix coexisting with the Si main phase, at least a part of the matrix has a crystal lattice parameter which is any one among n times, 1/n time, n$\sqrt{2}$ times, n/$\sqrt{2}$ times, and n$\sqrt{5}$ times of a crystal lattice parameter of the Si main phase (n is an integer).

The crystal lattice parameter of the matrix may be any one among 1 time, 2 times, ½ time, $\sqrt{2}$ time, 2$\sqrt{2}$ time, 1/$\sqrt{2}$ time, 3 times, ⅓ time, and $\sqrt{5}$ time of the crystal lattice parameter of the Si main phase.

According to another aspect of the present invention, exemplary embodiments of the present invention provide a negative electrode active material for a secondary battery, including: a Si main phase formed of crystalline Si; and a matrix coexisting with the Si main phase, a lattice mismatch ratio of a crystal lattice parameter of at least a part of the matrix to a crystal lattice parameter of the Si main phase according to Formula 1 is 12% or less.

$$\text{Lattice mismatch ratio}(\%) = \min\left\{\frac{|n \cdot a_{Matrix} - m \cdot a_{Si}|}{m \cdot a_{Si}}, \frac{|n \cdot a_{Matrix} - \frac{1}{m}a_{Si}|}{\frac{1}{m}a_{Si}}, \frac{|n \cdot a_{Matrix} - m \cdot \sqrt{2}\, a_{Si}|}{m \cdot \sqrt{2}\, a_{Si}}, \frac{|n \cdot a_{Matrix} - \frac{\sqrt{2}}{m}a_{Si}|}{\frac{\sqrt{2}}{m}a_{Si}}, \frac{|n \cdot a_{Matrix} - m \cdot \sqrt{5}\, a_{Si}|}{m \cdot \sqrt{5}\, a_{Si}}, \frac{|n \cdot a_{Matrix} - \frac{\sqrt{5}}{m}a_{Si}|}{\frac{\sqrt{5}}{m}a_{Si}}\right\} \times 100$$

[Formula 1]

Herein, $a_{Matrix}$ may be a lattice parameter of a phase forming the matrix, $a_{Si}$ may be a lattice parameter of Si, and n and m may be natural numbers.

A crystal system included in the matrix may include one or more among a cubic crystal system, a tetragonal crystal system, and an orthorhombic crystal system.

The crystal system included in the matrix may include one or more among a Face Centered Cubic (FCC) structure, a Body Centered Cubic (BCC) structure, and a Hexagonal Close Packed (HCP) structure.

In the HCP structure, a ratio of c/a may be in a range of 1,470 to 1.796, and the HCP structure may be regulated by the Formula below.

$$a_{Matrix\_HCP} = \sqrt{2}/2 * a_{Matrix\_cubic}$$

Herein, $a_{Matrix\_HCP}$ may be a lattice parameter in the HCP structure included in the matrix, and $a_{Matrix\_cubic}$ may be a lattice parameter in the cubic structure included in the matrix.

The matrix may include an amorphous phase, and a K phase and a P phase including crystal phases having different crystal structures, the K phase may include a nano grain structure and the P phase may include a grain structure having a larger size than a size of the K phase, and the K phase and the P phase may be cubic.

The K phase may have a three-layer structure including the K phase, and the P phase may have a two-layer structure including the P phase, and the three-layer structure may include the Si main phase, an amorphous phase provided on a periphery of the Si main phase, and the K phase that is the nano grain formed in at least a part of an interface between the Si main phase and the amorphous phase, and the two-layer structure may include the Si main phase that is a Si crystal having a nano size on a periphery of the P phase, in which a crystal phase of the P phase may have a larger size than a size of the Si main phase.

The K phase or the P phase may form a coherent or semi-coherent interface with the Si main phase.

The P phase may be a meta stable phase disappearing when is slowly cooled or is heat treated at a temperature of 500° C. or higher.

The lattice parameter of at least a part of the matrix may be obtained by the Formula below.

$$a_{Matrix}[\text{Å}] = n1 * (a_{Si} \pm 12\%)$$

Herein, $a_{Matrix}$ may be a lattice parameter of the phase forming the matrix, and $a_{Si}$ may be a lattice parameter of Si, and when n1 is 1, $a_{Matrix}$ may be 4.779 to 6.083 Å,
when n1 is 2, $a_{Matrix}$ may be 9.559 to 12.165 Å,
when n1 is ½, $a_{Matrix}$ may be 2.390 to 3.041 Å,
when n1 is $\sqrt{2}$, $a_{Matrix}$ may be 9.559 to 12.165 Å,
when n1 is 2$\sqrt{2}$, $a_{Matrix}$ may be 13.518 to 17.205 Å,
when n1 is 1/$\sqrt{2}$, $a_{Matrix}$ may be 3.379 to 4.301 Å,
when n1 is 3, $a_{Matrix}$ may be 14.338 to 18.248 Å,
when n1 is ⅓, $a_{Matrix}$ may be 1.593 to 2.028 Å, and
when n1 is $\sqrt{5}$, $a_{Matrix}$ may be 10.687 to 13.601 Å.

The lattice parameter of at least a part of the matrix may be obtained by the Formula below.

$$a_{Matrix}[\text{Å}] = n2 * (a_{Si} \pm 6\%)$$

Herein, $a_{Matrix}$ may be a lattice parameter of the phase forming the matrix, and $a_{Si}$ may be a lattice parameter of Si, and when n2 is 1, $a_{Matrix}$ may be 5.105 to 5.757 Å,
when n2 is 2, $a_{Matrix}$ may be 10.210 to 11.514 Å,
when n2 is ½, $a_{Matrix}$ may be 2.553 to 2.878 Å,
when n2 is $\sqrt{2}$, $a_{Matrix}$ may be 7.220 to 8.141 Å,
when n2 is 2$\sqrt{2}$, $a_{Matrix}$ may be 14.440 to 16.283 Å,
when n2 is 1/$\sqrt{2}$, $a_{Matrix}$ may be 3.610 to 4.071 Å,
when n2 is 3, $a_{Matrix}$ may be 15.315 to 17.271 Å,
when n2 is ⅓, $a_{Matrix}$ may be 1.702 to 1.919 Å, and
when n2 is $\sqrt{5}$, $a_{Matrix}$ may be 11.415 to 12.873 Å.

An amorphization degree may be 25% to 65%, and an XRD peak may be $I_{Si}/I_{matrix} > 1$.

($I_{Si}$ is an intensity value of a maximum value among XRD peaks of a silicon phase, and $I_{matrix}$ is an intensity value of a maximum value among the remaining peaks except for the Si phase)

The Si main phase may be crystalline, and a length of a width of a crystal region of the Si main phase may have a size of 10 nm to 200 nm when a cross-section is observed.

The Si main phase may have a structure which is crystalline and is connected up to a surface of an alloy, and may include a path through which Li is allowed to enter during charging/discharging.

The negative electrode active material for the secondary battery may be formed by a chemical formula below, and an expansion rate the negative electrode active material for the secondary battery after 50 cycles may be in a range of 70 to 150%, and an amorphization degree of a fine crystal region within the matrix may be 25% to 65%.

$Si_xTi_yFe_zAl_u$ (x, y, z, and u are atom % (at %), x: 1−(y+z+u), y: 0.09 to 0.14, z: 0.09 to 0.14, u: larger than 0.01 and less than 0.2.

The expansion rate of the negative electrode active material for the secondary battery after 50 cycles may be 70 to 150%, and Al may be in a range of 5 to 19% based on atom % (at %).

In the negative electrode active material for the secondary battery, each of Ti and Fe may be 9 to 12.5% based on atom % (at %).

According to still another aspect of the present invention, exemplary embodiments of the present invention provide a secondary battery, including: a negative electrode including the negative electrode active material for the secondary battery of claim 1 or 3; a positive electrode; and an electrolyte, in which the negative electrode active material for the secondary battery includes a Si main phase formed of crystalline Si, and a matrix coexisting with the Si main phase, the matrix includes an amorphous phase, and a K phase and a P phase including crystal phases having different crystal structures, in which the K phase has a three-layer structure including the K phase, and the P phase has a two-layer structure including the P phase, and the three-layer structure includes the Si main phase, an amorphous phase provided on the periphery of the Si main phase, and the K phase that is the nano grain formed in at least a part of an interface between the Si main phase and the amorphous phase, and in the two-layer structure, the Si main phase that is a Si crystal having a nano size is provided on the periphery of the P phase having a grain structure having a larger size than a size of the K phase.

The negative electrode may be formed of the negative electrode active material, of which an expansion rate after 50 cycles is 70 to 150%, an amorphization degree in an alloy formed by a chemical formula below is 25 to 65%, and Si is in the range of 60 to 70%, Ti is in the range of 9 to 14%, Fe is in the range of 9 to 14%, and Al is in the range of 5 to 19% based on atom % (at %).

$Si_xTi_yFe_zAl_u$ [Formula]

(x, y, z, and u are atom % (at %), x: 1−(y+z+u), y: 0.09 to 0.14, z: 0.09 to 0.14, u: 0.05 to 0.19).

Advantageous Effects

As described above, according to the present invention, it is possible to provide the silicon-based negative electrode active material, that is, the negative electrode active material for the secondary battery, in which a lattice mismatch ratio of a matrix coexisting with silicon to the crystalline silicon is decreased.

Further, according to the present invention, it is possible to provide the negative electrode active material for the secondary battery, which has a three-layer structure and a two-layer structure including silicon, thereby suppressing cracking due to a scattering phenomenon of the negative electrode active material during charging/discharging by the structures.

Further, according to the present invention, it is possible to provide the negative electrode active material for the secondary battery, which has little change in volume during charging/discharging, so that electrical insulation does not occur well, and which has excellent initial efficiency and an excellent capacity maintenance characteristic, and the secondary battery using the same.

DESCRIPTION OF DRAWINGS

FIG. 1A is a schematic diagram illustrating an existing silicon alloy-based negative electrode active material, and FIG. 1B is a schematic diagram illustrating a state where silicon and a matrix material form an incoherent interface and a picture of a cross-section of tissue of a cell manufactured by adopting the active material after a charging/discharging test of 50 cycles.

FIG. 2A is a schematic diagram illustrating a three-layer structure of a silicon alloy-based negative electrode active material according to an exemplary embodiment of the present invention, and FIG. 2B is a schematic diagram and a tissue picture illustrating a state where silicon and a matrix material form a coherent or semi-coherent interface.

FIG. 3A is a TEM picture illustrating a two-layer structure including a P phase in a negative electrode active material for a secondary battery according to the exemplary embodiment of the present invention, FIG. 3B is a TEM diffraction image of 4-fold, FCC[100] of the P phase, and FIG. 3C is a TEM diffraction image of 3-fold, FCC[100] of the P phase.

FIG. 4A is a diagram illustrating a structure of a silicon crystal that is a Si main phase, and FIG. 4B is a tissue picture of a Si main phase that is a crystal phase and a nano grain matrix layer that is a K phase in the exemplary embodiment of the present invention.

FIGS. 5A to 5C are schematic diagrams illustrating a form of an interface according to a lattice mismatch ratio of silicon that is a Si main phase and the matrix.

FIG. 6A is a diagram illustrating XRD peak characteristics of a crystalline Si main phase and a matrix phase, FIG. 6B is a diagram illustrating XRD peak patterns in the case of slow cooling and rapid cooling in the exemplary embodiment of the present invention, and FIG. 6C is a diagram illustrating a TEM diffraction pattern of a matrix of the slowly cooled negative electrode active material in the exemplary embodiment of the present invention.

FIGS. 7A and 7B show schematic diagrams illustrating calculation of an amorphization degree in the exemplary embodiment of the present invention.

FIG. 8 is a diagram illustrating an XRD pattern after performing a post heat treatment on Example 1 which uses a Si, Ti, Fe, and Al alloy as an exemplary embodiment of the present invention.

FIG. 9 is a TEM picture of a material related to Example 1 of FIG. 8.

FIG. 10A illustrates an XRD peak characteristic and a negative electrode active material before a life test of Experimental Example 3, and FIG. 10B is a diagram illustrating a considerable decrease in a discharging capacity due to a scattering phenomenon after 50 cycles.

FIGS. 11A and 11B are diagrams illustrating a decrease in a capacity due to a scattering phenomenon after 50 cycles in Experimental Example 4.

FIGS. 12A and 12B are diagrams illustrating a rapid decrease in a capacity due to a scattering phenomenon after 50 cycles in Experimental Example 5.

BEST MODE

Other specific matters of the exemplary embodiment are included in the detailed description and the drawings.

Advantages and characteristics, and a method for achieving them will be clear when exemplary embodiments described in detail with reference to the accompanying drawings are referred to. However, the present invention is not limited to exemplary embodiments disclosed herein but will be implemented in various forms, and the exemplary embodiments are provided so that the present invention is completely disclosed, and a person of ordinary skilled in the art can fully understand the scope of the present invention, and the present invention will be defined only by the scope of the appended claims. Further, in the drawing, a part irrelevant to the present invention is omitted for clearness of the description of the present invention, and like reference numerals designate like elements throughout the specification.

Hereinafter, the present invention will be described with reference to the accompanying drawings.

FIG. 1A is a schematic diagram illustrating an existing silicon alloy-based negative electrode active material, and FIG. 1B is a schematic diagram illustrating a state where silicon and a matrix material form an incoherent interface and a picture of a cross-section of tissue of a cell manufactured by adopting the active material after a charging/discharging test of 50 cycles.

FIG. 2A is a schematic diagram illustrating a three-layer structure of including a K phase in a negative electrode active material for a secondary battery according to an exemplary embodiment of the present invention, and FIG. 2B is a schematic diagram and a tissue picture illustrating a state where a crystalline Si main phase and a matrix material, in which the Si main phase is mixed, form a coherent or semi-coherent interface in FIG. 2A.

FIG. 3A is a TEM picture illustrating a two-layer structure including a P phase in the negative electrode active material for the secondary battery according to the exemplary embodiment of the present invention, FIG. 3B is a TEM diffraction image of 4-fold, FCC[100] of the P phase, and FIG. 3C is a TEM diffraction image of 3-fold, FCC[100] of the P phase.

The negative electrode active material for the secondary battery according to the exemplary embodiment of the present invention includes: a Si main phase formed of crystalline Si; and a matrix coexisting with the Si main phase, in which at least a part of the matrix may have a crystal lattice parameter which is any one among n times, 1/n time, n√2 time, n/√2 times, and n√5 times of a crystal lattice parameter of the Si main phase (n is an integer). Particularly, the crystal lattice parameter of the matrix may be any one among one time, two times, ½ time, √2 times, 2√2 times, 1/√2 time, 3 times, ⅓ time, and √5 times of the crystal lattice parameter of the Si main phase.

Further, the negative electrode active material for the secondary battery according to the exemplary embodiment of the present invention includes: a Si main phase formed of crystalline Si; and a matrix coexisting with the Si main phase, in which a lattice mismatch ratio according to Formula 1 below based on the crystal lattice parameter of at least a part of the matrix to the crystal lattice parameter of the Si main phase may be 12% or less.

Lattice mismatch ratio(%) = [Formula 1]

$$\min\left\{\frac{|n \cdot a_{Matrix} - m \cdot a_{Si}|}{m \cdot a_{Si}}, \frac{|n \cdot a_{Matrix} - \frac{1}{m}a_{Si}|}{\frac{1}{m}a_{Si}}, \right.$$

$$\frac{|n \cdot a_{Matrix} - m \cdot \sqrt{2}\, a_{Si}|}{m \cdot \sqrt{2}\, a_{Si}}, \frac{|n \cdot a_{Matrix} - \frac{\sqrt{2}}{m}a_{Si}|}{\frac{\sqrt{2}}{m}a_{Si}},$$

$$\left.\frac{|n \cdot a_{Matrix} - m \cdot \sqrt{5}\, a_{Si}|}{m \cdot \sqrt{5}\, a_{Si}}, \frac{|n \cdot a_{Matrix} - \frac{\sqrt{5}}{m}a_{Si}|}{\frac{\sqrt{5}}{m}a_{Si}}\right\} \times 100$$

Herein, $a_{Matrix}$ is a lattice parameter of a phase forming the matrix, $a_{Si}$ may be a lattice parameter of Si, and n and m may be natural numbers.

The lattice mismatch ratio in Formula 1 is a ratio of (|crystal lattice parameter ($a_{Matrix}$) of matrix—any one or more among n times, 1/n time, n√2 times, n/√2 times, and n√5 times of crystal lattice parameter ($a_{Si}$) of the Si main phase|)/(any one or more among n times, 1/n time, n√2 times, n/√2 times, and n√5 times of crystal lattice parameter ($a_{Si}$) of the Si main phase|), and may have a minimum value for the ratio value. Particularly, the lattice mismatch ratio according to Formula 1 may be 6% or less.

Referring to FIGS. 1A and 1B, in the case of an existing silicon alloy-based negative electrode active material, a crystalline matrix material surrounds a silicon material. However, the crystalline matrix provided around the silicon material forms an incoherent interface with the silicon to have high interface energy, and thus, it fails to suppress expansion or scattering of the silicon bonded to lithium discharged from a positive electrode during a process of progressing charging/discharging of a lithium ion secondary battery. In the picture of the cross-section of FIG. 1B, a bright region is a matrix portion, and it can be seen that an interface between the silicon and the matrix fails to be maintained, and the silicon and the matrix are connected with each other according to an expansion of a volume of the silicon region and a matrix region is split and scattered.

The negative electrode active material for the secondary battery according to the exemplary embodiment of the present invention may be formed of a Si main phase and a matrix, and at least a part of the matrix may form a coherent or semi-coherent interface with the Si main phase. For example, the matrix may include an amorphous phase and one or more crystal phases, and the crystal phase may include a K phase and a P phase. The K phase may include nano grain having a smaller size than that of the Si main phase, and the P phase may include grain having a larger size than those of the K phase and the Si main phase. For example, an order of the size of the crystalline grain may be the P phase, the Si main phase, and the K phase.

In the negative electrode active material according to the exemplary embodiment of the present invention, the K phase may form a three-layer structure, and the P phase may form a two-layer structure. For example, in the K phase, an amorphous phase is provided at an outer periphery of a Si main page with the Si main phase as a core, and the K phase may be interposed between the Si main phase and at least a part of the amorphous phase. Further, the P phase may include a grain structure including a plurality of crystal defects therein. The P phase may form a two-layer structure, and in this case, the P phase may be configured as a core and may be formed in a structure in which the Si main phase having a nano size surrounds the periphery of the P phase.

The negative electrode active material according to the exemplary embodiment of the present invention may include both the two-layer structure and the three-layer structure, and the two-layer structure and the three-layer structure are complexly associated with each other to act, thereby suppressing the silicon-based negative electrode active material from being expanded generable during the charging/discharging of the secondary battery.

Hereinafter, the three-layer structure will be first investigated.

Referring to FIGS. 2A and 2B, the negative electrode active material for the secondary battery according to the exemplary embodiment of the present invention may include a Si main phase formed of crystalline Si, and a matrix coexisting with the Si main phase. The matrix may have a three-layer structure including an amorphous phase at an outer periphery of the Si main phase and a K phase, for example, nano grain, as a crystal phase in an interface between the Si main phase and the amorphous matrix. The negative electrode active material for the secondary battery having the three-layer structure has a clearly different structure from that of the negative electrode active material illustrated in FIGS. 1A and 1B, and has the structure capable of considerably suppressing silicon bonded to lithium from being expanded or scattered.

In the exemplary embodiment of the present invention, the Si main phase included in the three-layer structure is a crystalline phase located at a core, and has a length of a width of a crystal area of 10 nm to 200 nm when a cross-section of the Si main phase is observed, and is connected to each other three-dimensionally to continue up to a surface of the alloy. When the crystalline Si main phase is isolated, lithium is not allowed to enter during charging/discharging of a secondary battery, so that the Si main phase is substantially three-dimensionally connected up to the surface of the alloy. Accordingly, it is possible to secure a path, through which lithium discharged from a positive electrode is allowed to enter during charging/discharging of a secondary battery.

The amorphous phase exists at the outer periphery of the Si main phase, and at least a part of the interface between the Si main phase and the amorphous phase may be covered with the K phase that is nano grain. Further, the interface between the Si main phase and the amorphous phase may form a coherent or semi-coherent interface, and the amorphous phase may be a stable phase which does not react with lithium or may be a material which is capable of partially reacting with lithium together with the Si main phase. For example, the Si main phase may form coherence or semi-coherence with the K phase, and the K phase maintains the structure of the Si main phase and limits a volume of the negative electrode active material to a predetermined range, thereby suppressing the negative electrode active material from being expanded during the process of charging/discharging the secondary battery.

In the three-layer structure, after the Si main phase that is the core and the crystalline K phase on the periphery of the Si main phase are formed, the amorphous phase may be provided at the outer periphery of the K phase. In this case, when the amorphous phase is not sufficiently provided together with the Si main phase and the K phase, the secondary battery using the amorphous phase as the negative electrode active material may exhibit an effect in that an initial capacity is excellent, but has a problem in that the suppression of the expansion by the amorphous phase is not sufficient, thereby causing a problem. That is, the three-layer structure including the K phase includes all of the Si main phase that is the core, the K phase, which is provided at least a part of the periphery of the Si to form coherence or semi-coherence with the Si main phase, and the amorphous phase fixing the K phase on the periphery of the K phase, thereby providing a silicon-based negative electrode active material having an excellent initial capacity and capable of effectively controlling the expansion.

The negative electrode active material for the secondary battery having the three-layer structure according to the exemplary embodiment of the present invention has a characteristic in that the expansion of the Si main phase bonded to lithium during the charging/discharging is considerably excellent compared to the existing silicon-based negative electrode active material by the K phase that is the nano grain covering the interface between the Si main phase and the amorphous phase.

Referring to FIGS. 3A to 3C, the negative electrode active material for the secondary battery according to the exemplary embodiment of the present invention may further have a two-layer structure, in which a P phase is included, in addition to the three-layer structure. The P phase may be a cubic crystalline structure as illustrated in a Transmission Electron Microscope (TEM) diffraction image, and a lattice mismatch ratio of the P phase to the Si main phase may be 0.53%. A Si main phase that is a Si crystal having a nano size may be distributed on the periphery of the P phase. The P phase may be provided with grain having a larger size than that of the Si main phase, and may include grain having a larger size than that of the K phase forming the three-layer structure.

In the two-layer structure including the P phase, when lithium is inserted into the Si main phase during the charging/discharging, the expansion of the Si main phase is suppressed in the interface with the P phase, so that it is possible to control the expansion of the Si main phase. In the meantime, the P phase includes the plurality of crystal defects therein, so that an XRD peak is not clearly exhibited, and the P phase may be a meta stable phase which disappears when is slowly cooled or is heat treated at a temperature of 500° C. or higher.

Particularly, referring to FIG. 3A, it can be seen that the P phase is approximately provided at a center portion and the Si main phase having the nano size is provided on the periphery of the P phase while surrounding the P phase. It can be seen that there are many twin crystals and double diffraction inside the P phase. Table 1 represents an analysis result of a TEM diffraction image. Referring to Table 1, a lattice parameter of the P phase may be 3.86 Å, for example, $a_{P\text{-}phase}$ may be 3.86 Å. $\sqrt{2}a_{P\text{-}phase}$ is 5.46 Å, and a lattice mismatch ratio for the case where $a_{Si}$ is 5.431 Å may be 0.53%. The ratio is a very low lattice mismatch value in the level of forming coherent matching.

TABLE 1

| P-phase, ZA[001] | | |
|---|---|---|
| Matrix | Distance between diffraction spots | d (Å) |
| d (200) | 5.18 | 1.93 |
| d (100) | | 3.86 |

The negative electrode active material for the secondary battery according to the exemplary embodiment of the present invention may include a Si main phase that is a crystalline phase and a matrix coexisting with the Si main phase. The matrix may include an amorphous phase, and a K phase and a P phase that are the crystalline phases, and the K phase and the P phase may be formed of grain having different sizes. When a secondary battery to which the negative electrode active material according to the exemplary embodiment of the present invention is applied is charged/discharged, the three-layer structure by the K phase and the two-layer structure by the P phase act in a complex manner, thereby suppressing the Si main phase from being expanded and controlling the Si main phase to uniformly maintain a predetermined volume during the charging/discharging process.

A method of producing a silicon-based negative electrode active material having a three-layer structure including a K phase and a two-layer structure including a P phase according to an exemplary embodiment of the present invention may include: melting silicon and a matrix material together, performing a cooling treatment on the melted silicon and matrix material to crystalize a silicon layer; and crystallizing the matrix material to grain having a larger size than that of the K phase that is a crystalline nano grain matrix layer or a Si main phase so as to be adjacent to the crystallized silicon layer, for example, the Si main phase, and further includes forming an amorphous phase that is an amorphous matrix on a surface of the K phase that is the crystalline nano grain matrix layer.

In the crystallizing of the silicon layer, a rapid solidification method may be used as the cooling treatment. A mass percentage (wt %) of silicon melted with the matrix material in the crystallizing of the silicon layer may be 20 wt % to 90 wt %. In the crystallizing of the silicon layer, it is necessary to adjust a composition ratio of the silicon and the matrix material so that the silicon is first crystallized when the molten metal is cooled.

For example, the K phase may have the three-layer structure including the K phase, and the P phase may have the two-layer structure including the P phase. The three-layer structure may include the Si main phase, the amorphous phase provided on the periphery of the Si main phase, and the K phase that is the nano grain formed in at least a part of an interface between the Si main phase and the amorphous phase, and the two-layer structure may include the Si main phase that is a Si crystal having a nano size on the periphery of the P phase. In addition, the K phase or the P phase may form a coherent or semi-coherent interface with the Si main phase.

In this case, a lattice mismatch ratio of the matrix material to the Si main phase that is the crystalline silicon may be within 12%. When a lattice parameter difference is small, the K phase or the P phase may be grown while forming the coherent or semi-coherent interface with Si.

In the crystallizing to the P phase, the matrix may be crystallized on a surface of the cooled solid silicon, and when the matrix is crystallized, the matrix may include an amorphous matrix, and the K phase and the P phase having different crystal structures. For example, the K phase and the P phase may be cubic. The K phase may be a crystalline nano grain matrix layer, and starts to be crystallized in a terrace, a ledge, and a kink on an exposed surface of the silicon crystal, and the matrix is grown in a direction of decreasing interface energy.

Subsequently, the method of producing the silicon-based negative electrode active material may further include forming the amorphous phase, and in the forming of the amorphous phase, an amorphous matrix layer is formed on the crystalline nano grain matrix layer through an appropriate rapid solidification process. an interface between the silicon and the crystalline nano grain matrix layer has very excellent bonding force, so that it is possible to suppress cracking, electrolyte permeation, active material scattering, and the like.

In the meantime, in the case of the negative electrode active material according to the exemplary embodiment of the present invention, a mechanical alloy method may be used. The mechanical alloy method is a method of mixing two or more kinds of powder together and mechanically alloying the two or more kinds of powder through ball milling, and is a method, in which the two kinds of powder are ground and re-combined little by little while repeatedly receiving impact by a drop of a ball to be alloyed. The method is capable of alloying raw materials without heating and melting raw materials at a high temperature, so that there is an advantage in that even two materials having two states that cannot coexist can be mutually alloyed. In the mechanical alloying method, a silicon solid mass or silicon powder and a matrix material are mixed and inserted into a vessel, and in this case, a size of each powder and a size of a ceramic ball are appropriately adjusted. As described above, when the mechanical alloying method is used, a range of material selection is wide compared to the rapid solidification process and it is possible to obtain a fine structure, so that it is possible to produce the negative electrode active material having the three-layer structure like the present invention.

That is, the present invention includes the mixing the silicon crystal powder and the matrix powder (for example, the material configuring the negative electrode active material, other than silicon) and then inserting the mixed powder into the vessel, and in this case, a size of each power and a size of a ceramic ball are appropriately adjusted so that the materials are well mechanically alloyed. Subsequently, the silicon and matrix powder are smashed and cohere repeatedly by mutual mechanical collision through the ball milling. The silicon particle maintains a crystalline phase with a size of 10 nm to 200 nm and the matrix phase becomes amorphous, so that it is possible to produce the negative electrode active material having the three-layer structure including the Si main phase that is the silicon layer, the amorphous phase on the periphery of the Si main phase, and the K phase that is the nano grain matrix layer formed in the interface between the Si main phase and the amorphous phase, and the two-layer structure including the P phase including grain having a larger size than that of the Si main phase as a core and the Si main phase having a nano size on the periphery of the P phase.

In the method of producing the negative electrode active material through the mechanical alloying method, a negative electrode active material is produced by using a material, of which a lattice mismatch ratio to a silicon crystal is within 12% when the matrix material is in a crystal state, and in the method of producing the negative electrode active material by mixing the silicon crystal powder and the matrix powder and then mechanically alloying the mixed silicon crystal powder and matrix powder through ball milling, it is possible to produce a negative electrode active material for the secondary battery which has a three-layer structure including a silicon layer, an amorphous matrix layer that is an amorphous phase on the outer periphery of the silicon layer, and a nano grain matrix layer that is a K phase formed in an interface between the silicon layer and the amorphous matrix layer, in which the matrix layer and the silicon layer form a coherent or semi-coherent interface.

In the meantime, in the mechanical alloying method, the alloying of the silicon and matrix powder is progressed while the silicon and matrix powder is repeatedly smashed or cohere by mutual mechanical collision, and the silicon particle maintains a crystal phase with a size of 10 nm to 200 nm and the matrix phase is amorphized, thereby generating a unique three-layer structure.

In the exemplary embodiment of the present invention, the matrix material which is applied to the silicon-based negative electrode active material to suppress the negative electrode active material from being scattered is described below.

The negative electrode active material for a lithium ion secondary battery may be formed of a silicon-based alloy, and the negative electrode active material for the secondary battery may include a Si main phase formed of crystalline Si, and a matrix coexisting with the Si main phase. The matrix may be a stable phase which does not electrochemically react with lithium or may be a material which is capable of partially reacting with lithium together with Si.

Further, in the exemplary embodiment of the present invention, the matrix may include at least a part of a crystal system, and the crystal system of the matrix may include one or more among a cubic crystal system, a tetragonal crystal system, and an orthorhombic crystal system, and particularly, the crystal system of the matrix may include one or more among a Face Centered Cubic (FCC) structure, a Body Centered Cubic (BCC) structure, and a Hexagonal Close Packed (HCP) structure. Preferably, the matrix may have the FCC structure. For example, in the HCP structure, a ratio of c/a is in the range of 1,470 to 1.796, and a lattice parameter of the matrix layer having the HCP structure may be regulated by the Formula below.

$$a_{Matrix\_HCP} = \sqrt{2}/2 * a_{Matrix\_cubic}$$

When the negative electrode active material is crystalized, the crystal system of the matrix is the HCP structure, and the ratio of c/a may be 1.470 to 1.796 ($\sqrt{(8/3)}\pm 10\%$). Even in the case of the HCP structure, when c/a=$\sqrt{(8/3)}(\approx 1.633)$, the closest atomic number and a distance between atoms are the same as those of the FCC structure, so that the crystal system of the matrix may form a coherent interface with silicon that is a Si main phase.

The negative electrode active material according to the present invention may include a Si main phase and a matrix, and the matrix may include an amorphous phase and a crystalline phase, such as a K phase and a P phase. Crystalline present within the matrix is further amplified by additionally crystallizing the negative electrode active material or heat-treating the negative electrode active material at a temperature range of 500° C. to 800° C. for 40 minutes to 80 minutes, preferably, 600° C. to 800° C. for 60 minutes, thereby more clearly checking the crystalline of the matrix.

A crystal lattice parameter of at least a part of the matrix may be any one among n times, 1/n time, n√2 times, n/√2 times, and n√5 times of a crystal lattice parameter of the Si main phase (n is an integer). When the lattice parameter of the matrix material is any one among n times, 1/n time, n√2 times, n/√2 times, and n√5 times of the lattice parameter of the silicon crystal (n is an integer), it is possible to suppress the negative electrode active material from being scattered, thereby preventing cracking and electrolyte permeation. Particularly, the crystal lattice parameter of the matrix may be any one among 1 time, 2 times, ½ time, √2 times, 2√2 times, 1/√2 time, 3 times, ⅓ time, and √5 times of the crystal lattice parameter of the Si main phase.

In the meantime, a lattice mismatch ratio of the matrix material to the Si main phase that is the silicon lattice according to Formula 1 below may be 12% or less, more preferably, 6% or less.

Lattice mismatch ratio(%) = [Formula 1]

$$\min \left\{ \frac{|n \cdot a_{Matrix} - m \cdot a_{Si}|}{m \cdot a_{Si}}, \frac{|n \cdot a_{Matrix} - \frac{1}{m} a_{Si}|}{\frac{1}{m} a_{Si}}, \right.$$

$$\frac{|n \cdot a_{Matrix} - m \cdot \sqrt{2} a_{Si}|}{m \cdot \sqrt{2} a_{Si}}, \frac{|n \cdot a_{Matrix} - \frac{\sqrt{2}}{m} a_{Si}|}{\frac{\sqrt{2}}{m} a_{Si}},$$

$$\left. \frac{|n \cdot a_{Matrix} - m \cdot \sqrt{5} a_{Si}|}{m \cdot \sqrt{5} a_{Si}}, \frac{|n \cdot a_{Matrix} - \frac{\sqrt{5}}{m} a_{Si}|}{\frac{\sqrt{5}}{m} a_{Si}} \right\} \times 100$$

Herein, $a_{Matrix}$ is a lattice parameter of a phase forming the matrix, $a_{Si}$ may be a lattice parameter of Si, and n and m may be natural numbers.

As described above, the negative electrode active material, in which the lattice mismatch ratio of the matrix material to the Si main phase is 12% or less, is used, so that the negative electrode active material is suppressed from being scattered to prevent cracking and electrolyte permeation. In the case where the lattice mismatch ratio exceeds 12%, whenever four to five crystal unit cells are stacked, one dislocation is generated. For example, a parameter of one side of the unit cell of the silicon is 5.433 Å, so that when the lattice mismatch ratio is 12%, dislocation is generated at every 20 to 25 Å (2 to 2.5 mm). It is determined that the size of 20 to 25 Å (2 to 2.5 mm) is a maximum nano grain size when the lattice mismatch ratio is 12%, and when the lattice mismatch ratio exceeds 12%, the dislocation is excessively frequently generated, so that it cannot be said that a coherent interface is formed. When the lattice mismatch ratio is 50%, the dislocation in the unit cell is alternately generated every other lattice, so that an incoherent interface is formed.

In the exemplary embodiment of the present invention, it can be seen that the lattice mismatch ratio of the matrix coexisting with the Si main phase to the Si main phase that is crystalline silicon has the range of 6% or less, the scattering of the negative electrode active material is most suppressed. When the lattice mismatch ratio is 6% or less, one dislocation is generated in about every 10 lattices, so that a coherent interface having a size of about 5 nm and having no defect is continued. In this case, compared to the case where the lattice mismatch ratio is 12%, a coherent interface or a semi-coherent interface is easily generated to be advantageous to the process of producing a negative electrode active material, and a possibility in that nano grain exists in the surface of the silicon crystal without any gap is increased.

FIG. 4A is a diagram illustrating a structure of a silicon crystal that is a Si main phase, and FIG. 4B is a tissue picture of a Si main phase that is a crystal phase and a nano grain matrix layer that is a K phase in the exemplary embodiment of the present invention.

Referring to FIG. 4A, a lattice parameter of silicon $a_{Si}$=5.431 Å. In the meantime, a lattice parameter of the cubic structure matrix for suppressing expansion or scattering of silicon may be obtained by the Formula below when a lattice mismatch ratio is 12% or less.

$$*a_{Matrix}[\text{Å}] = n1*(a_{Si} \pm 12\%)$$

Herein, $a_{Matrix}$ may be a lattice parameter of the phase forming the matrix, and $a_{Si}$ may be a lattice parameter of Si.

Particularly, when the lattice mismatch ratio is 12% or less, a crystal lattice parameter of the matrix may be any one among 1 time, 2 times, ½ time, √2 times, 2√2 times, 1/√2 time, 3 times, ⅓ time, and √5 times, of a crystal lattice parameter of the Si main phase.

When n1 is 1, $a_{Matrix}$ is 4.779 to 6.083 Å,
when n1 is 2, $a_{Matrix}$ is 9.559 to 12.165 Å,
when n1 is ½, $a_{Matrix}$ is 2.390~3.041 Å,
when n1 is √2, $a_{Matrix}$ is 9.559 to 12.165 Å,
when n1 is 2√2, $a_{Matrix}$ is 13.518 to 17.205 Å,
when n1 is 1/√2, $a_{Matrix}$ is 3.379 to 4.301 Å,
when n1 is 3, $a_{Matrix}$ is 14.338 to 18.248 Å,
when n1 is ⅓, $a_{Matrix}$ is 1.593~2.028 Å, and
when n1 is √5, $a_{Matrix}$ is 10.687 to 13.601 Å.

In the meantime, the most preferable range of a of the matrix is the range when the lattice mismatch ratio is 6% or less, and may be obtained by the Formula below.

$$a_{Matrix}[\text{Å}] = n2 * (a_{Si} \pm 6\%)$$

Particularly, herein, $a_{Matrix}$ is a lattice parameter of the phase forming the matrix, $a_{Si}$ is a lattice parameter of Si, and when the lattice mismatch ratio is 6% or less, a crystal lattice parameter of the matrix may be any one among 1 time, 2 times, ½ time, √2 time, 2√2 time, 1/√2 time, 3 times, ⅓ time, and √5 time of a crystal lattice parameter of the Si main phase, and may have the range described below.

When n2 is 1, $a_{Matrix}$ is 5.105 to 5.757 Å,
when n2 is 2, $a_{Matrix}$ is 10.210 to 11.514 Å,
when n2 is ½, $a_{Matrix}$ is 2.553 to 2.878 Å,
when n2 is √2, $a_{Matrix}$ is 7.220 to 8.141 Å,
when n2 is 2√2, $a_{Matrix}$ is 14.440 to 16.283 Å,
when n2 is 1/√2, $a_{Matrix}$ is 3.610 to 4.071 Å,
when n2 is 3, $a_{Matrix}$ is 15.315 to 17.271 Å,
when n2 is ⅓, $a_{Matrix}$ is 1.702 to 1.919 Å, and
when n2 is √5, $a_{Matrix}$ is 11.415 to 12.873 Å.

In the meantime, the preferable lattice mismatch ratio is organized and represented in Table 2 below.

TABLE 2

| Lattice mismatch ratio (mismatch %) | | | Minimum | Maximum |
|---|---|---|---|---|
| 6% | a | 5.431 | 5.105 | 5.757 |
| | 2a | 10.862 | 10.210 | 11.514 |
| | ½a | 2.7155 | 2.553 | 2.878 |
| | √2a | 7.6805 | 7.220 | 8.141 |
| | 2√2a | 15.3615 | 14.440 | 16.283 |
| | 1/√2a | 3.8405 | 3.610 | 4.071 |
| | 3a | 16.293 | 15.315 | 17.271 |
| | ⅓a | 1.8105 | 1.702 | 1.919 |
| | √5a | 12.14 | 10.687 | 13.601 |
| 12% | a | 5.431 | 4.779 | 6.083 |
| | 2a | 10.862 | 9.559 | 12.165 |
| | ½a | 2.7155 | 2.390 | 3.041 |
| | √2a | 7.6805 | 6.759 | 8.602 |
| | 2√2a | 15.3615 | 13.518 | 17.205 |
| | 1/√2a | 3.84 | 3.379 | 4.301 |
| | 3a | 16.293 | 14.338 | 18.248 |
| | ⅓a | 1.8105 | 1.593 | 2.028 |
| | √5a | 12.14 | 11.415 | 12.873 |

In the case of the HCP structure, a lattice parameter may be represented with √2/2 times of a lattice parameter of the cubic structure illustrated in Table 2.

$$a_{Matrix\_HCP} = \sqrt{2}/2 * a_{Matrix\_cubic}$$

$$\frac{c_{Matrix\_HCP}}{a_{Matrix\_HCP}} = \sqrt{\frac{8}{3}} (1 \pm 0.1) = 1.470 \sim 1.796$$

Herein, $a_{Matrix\_HCP}$ is a lattice parameter in the HCP structure included in the matrix, and $a_{Matrix\_cubic}$ is a lattice parameter in the cubic structure included in the matrix.

FIG. 4B is a tissue picture of a nano grain matrix layer (for example, a K phase) formed in an interface between a Si main phase that is a silicon layer and an amorphous matrix (for example, an amorphous phase) in the exemplary embodiment of the present invention.

The picture illustrated in FIG. 4B is a High Resolution Transition Electron Microscopy (HRTEM) image at a point, at which three regions of the Si main phase, the amorphous matrix layer, and the nano grain matrix layer formed in the interface between the Si main phase and the matrix phase meet. In the negative electrode active material, in which the Si main phase and the matrix coexist, at least one of the three regions is a silicon crystal phase, and at least one region represents a matrix phase. It can be seen that all of the three regions represent a Moiré pattern specific to crystalline. Accordingly, it can be seen that the matrix is only amorphized by XRD, but as the result of the confirmation through the HRTEM image, it can be seen that the nano grain matrix layer is formed.

FIGS. 5A to 5E are schematic diagrams illustrating a form of an interface according to a lattice mismatch ratio with silicon that is a Si main phase.

Referring to FIG. 5A, when a lattice mismatch ratio is 10%, a semi-coherent interface is formed between a crystal lattice of silicon that is the Si main phase and a crystal lattice of the matrix.

When the lattice mismatch ratio is 10% or less, one dislocation is generated in about every 10 lattices, so that a coherent interface having a size of about 5 nm and having no defect is continued. Preferably, the lattice mismatch ratio may be 6%. In this case, compared to the case where the lattice mismatch ratio is 20%, a coherent interface or a semi-coherent interface is easily generated to be advantageous to the process of producing a negative electrode active material, and a possibility in that nano grain exists in the surface of the silicon crystal without any gap is increased. For example, when the lattice mismatch ratio is 5%, one dislocation may be generated in every 20 lattices, and a coherent interface having a size of about 10 nm and having no defect may be formed.

Referring to FIG. 5B, when the lattice mismatch ratio is 20%, a semi-coherent interface is formed between a crystal lattice of the Si main phase that is crystalline silicon and a crystal lattice of the matrix coexisting with the Si main phase. Even when the lattice mismatch ratio of the matrix to the Si main phase has the range of 20% or less, the negative electrode active material is suppressed from being scattered.

In the meantime, as illustrated in FIG. 5C, when the lattice mismatch ratio is 30%, that is, when the lattice mismatch ratio exceeds 12%, it is difficult to form a coherent or semi-coherent interface with the silicon crystal lattice, and even though the silicon and the matrix partially form the coherent interface, interface energy is high, so that it is difficult to expect the effect in that the negative electrode active material is suppressed from being scattered.

FIG. 5D is a schematic diagram illustrating the case where a crystal lattice parameter of the matrix material is similar to n times, 1/n time, n√2 time, n/√2 time, and n√5 time of the lattice parameter of the silicon crystal that is the Si main phase (n is an integer). In this case, the interface energy decrease effect is also similarly exhibited, and the negative electrode active material is suppressed from being scattered, thereby preventing cracking and electrolyte permeation.

FIG. 5E illustrates the case where the lattice mismatch ratio is 5%, and it can be seen that one dislocation is generated in every 20 lattices, and a coherent interface having a size of about 10 nm and having no defect is formed.

Referring to FIGS. 5A to 5E, when the lattice mismatch ratio is 5%, a length of a coherent crystal face is in the level of 10 nm, which is most preferable, and when the lattice mismatch ratio is 10%, it can be seen that a length of a coherent crystal face is in the level of 5 nm, so that a good interface is obtained. However, when the lattice mismatch ratio is 20%, it can be seen that a length of a coherent crystal face is in the level of 2 to 3 nm, and in this case, it can be seen that interface energy is large, so that an effect of suppressing volume expansion is slight. Further, when the lattice mismatch ratio is 30%, an incoherent interface is formed, and it can be seen that interface energy is excessively increased, so that there is almost no effect in that volume expansion is suppressed.

In the exemplary embodiment of the present invention, the negative electrode active material for the secondary battery may include a three-layer structure including a K phase and a two-layer structure including a P phase.

FIG. 6A is a diagram illustrating XRD peak characteristics of a crystalline Si main phase and a matrix phase, FIG. 6B is a diagram illustrating XRD peak patterns in the case of slow cooling and rapid cooling in the exemplary embodiment of the present invention, and FIG. 6C is a diagram illustrating a TEM diffraction pattern of a matrix of the slowly cooled negative electrode active material in the exemplary embodiment of the present invention.

In the two-layer structure, the P phase has many internal crystal defects, so that a peak is not clearly represented in XRD, and may be a meta stable phase which disappears when is slowly cooled or is heat treated at a temperature of 500° C. or higher. In the meantime, referring to FIG. 6A, the three-layer structure including the K phase may have a characteristic described below.

As described above, the negative electrode active material for the secondary battery according to the exemplary embodiment of the present invention may have a three-layer structure including a crystalline Si main phase, an amorphous matrix layer on the periphery of the Si main phase, and a nano grain matrix that is a K phase formed in an interface between the Si main phase and the amorphous matrix. The negative electrode active material having the three-layer structure is clearly different from a structure of an existing negative electrode active material, and has the structure, which is capable of considerably suppressing silicon bonded to lithium from being expanded or scattered. As described above, in the exemplary embodiment of the present invention, the matrix phase is amorphous, and exhibits a small XRD peak compared to the Si main phase that is crystalline. Accordingly, $I_{si}/I_{matrix}>1$. In the meantime, when a peak of the Si main phase is smaller than a peak of the matrix, a capacity of a battery is very small and a life characteristic of the battery is not good.

In the exemplary embodiment of the present invention, the XRD peak is regulated as described below.

$I_{si}$: Maximum intensity value among XRD peaks of Si phase $I_{matrix}$: Maximum intensity value among XRD peaks of matrix phase Referring to FIG. 6A, in the cases of A11, A12, and A13, when the crystalline matrix is increased, $I_{si} \gg I_{matrix}$, so that $I_{si}/I_{Matrix}>1$ may be obtained, in the cases of A14 and A15, when the amorphous degree of the matrix is increased, $I_{si} \gg I_{matrix}$, so that $I_{si}/I_{matrix}>1$ may be obtained. In the meantime, FIG. 6B is a diagram illustrating XRD peak patterns in the case of slow cooling and rapid cooling in the exemplary embodiment of the present invention.

When the material is slowly cooled, a crystalline matrix phase having the FCC structure, in which the lattice mismatch ratio is 5.8%, is observed, but when the same material is rapid cooled, a considerable portion of the matrix phase is amorphized, there occurs a phenomenon, in which the peaks are widely distributed and spread to overlap each other.

In addition, FIG. 6C illustrates a TEM diffraction pattern of the matrix of the slowly cooled negative electrode active material in the exemplary embodiment of the present invention. Referring to the tissue picture, a crystal structure including both 3 fold and 4 fold is a cubic structure, and it can be seen that the crystal structure is the FCC structure when is analyzed together with the result of the XRD.

An amorphization degree and an expansion rate characteristic of the silicon-based negative electrode active material according to the exemplary embodiment of the present invention are described below.

In the case of the negative electrode active material used in the exemplary embodiment of the present invention, a size of an expansion rate of the negative electrode active material after 50 cycles was investigated according to a composition of a metal compound for the negative electrode active material used in the exemplary embodiment of the present invention and a range of the optimum expansion rate according to a change in the composition was derived.

In the exemplary embodiment of the present invention, there exists a fine crystal region in a matrix of an alloy, thereby enabling lithium to be more easily dispersed. Further, an existence ratio of the fine crystal region may be represented through the amorphization degree, and the amorphous region is formed on the matrix, so that it is possible to suppress a secondary battery from being expanded during charging of the secondary battery.

In the exemplary embodiment of the present invention, the negative electrode active material for the secondary battery may be formed of a silicon alloy including Si forming a crystalline Si main phase and other metals, for example, any one or more among Ti, Fe, and Al.

An amorphization degree of the silicon alloy may be 25% or more. When the amorphization degree is within the range, lithium in the negative electrode active material is very easily dispersed during the progress process of the charging/discharging in a lithium ion secondary battery. Further, when the amorphization degree is within the range, an expansion rate of the negative electrode active material after 50 cycles is also excellent, and thus, it can be seen that when the silicon alloy is used as the negative electrode active material, the volume of the silicon alloy is suppressed from being expanded during the charging. In the meantime, actually, in the present invention, the Si main phase is crystalline, so that the amorphization degree of the entire silicon alloy does not exceed 65%.

In the exemplary embodiment of the present invention, the amorphization degree of the silicon alloy may be 25% to 65% in the range (20° to 100°) of an XRD pattern diffraction angle 2θ of the alloy (2θ=20° to 100°). Within the range of the amorphization degree, the volume expansion is suppressed, so that electric insulation is well generated.

An amorphization degree used in the present invention is calculated as described below, and the amorphization degree may be calculated according to the illustration of FIGS. 7A and 7B.

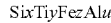

Amorphization degree (%)=((entire area−crystallization area))?entire area)×100

In the exemplary embodiment of the present invention, the high amorphization degree means that there are many fine crystal region, and thus, lithium ions are accumulated through a buffering action in the fine crystal regions during the charging, thereby obtaining an effect of suppressing the expansion factor of the volume.

Further, in the exemplary embodiment of the present invention, an expansion rate after 50 cycles has a range of 70 to 150%, and the negative electrode active material for the secondary battery expressed by the Formula below is provided.

$$Si_xTi_yFe_zAl_u$$

(x, y, z, and u are atom % (at %), x: 1−(y+z+u), y: 0.09 to 0.14, z: 0.09 to 0.14, u: larger than 0.01 and less than 0.2)

In the present exemplary embodiment, the Si has the range of 60 to 70% based on atom % (at %), and the Ti and the Fe have the ranges of 9 to 14%. In the meantime, the Al has the range larger than 1% and less than 20%, preferably, the range of 5 to 19%.

The Ti and the Fe included in the alloy are bonded to Si to form an intermetallic compound of $Si_2TiFe$. Accordingly, when each of the contents of Ti and Fe is 14 at %, 28 at % or more of Si is consumed for forming the intermetallic compound, so that a capacity per g of an active material is decreased, and in this case, in order to obtain a capacity of 1,000 mAh/g or more, the content of Si added needs to be very large.

In general, when the large amount of Si that is a semi-metal is contained, viscosity of a molten metal is high during the melting to degrade rapid solidification workability, so that the content of Si is maintained in the range of 70% or less as much as possible, and thus, it is preferable that the contents of Ti and Fe do not exceed 14%. In the exemplary embodiment of the present invention, it was derived that it is preferable to decrease the contents of Ti and Fe to 14% or less during the process of deriving the optimum alloy components in relation to the expansion rate.

In addition, Al may have the range larger than 1% and less than 20% based on at %. When Al is contained by about 1%, the active material is excessively expanded after 50 cycles, and the active material is scattered, so that Al of about 1% is not preferable. Further, when Al is contained by 20%, a discharging capacity by a change in a volume fraction of Si:Matrix is decreased, so that Al of 20% is not preferable. In the exemplary embodiment of the present invention, it was derived that when Al has the range of 5 to 19% based on at %, it is possible to obtain the most preferable range of the expansion rate, and it could be seen that within the range, a discharging capacity was not decreased. It is most preferable that Al is 10 to 19%, and in this range, it is possible to obtain the most preferable range of the expansion rate after 50 cycles, and a discharging capacity is not decreased.

Further, the method of producing the negative electrode active material of the present invention is not particularly limited, and includes the foregoing mechanical alloying method. Further, for example, various fine powder producing methods (a gas atomizer method, a centrifugal gas atomizer method, a plasma atomizer method, a rotating electrode method, a mechanical alloying method, and the like) publicly known in the field may be used. In the present invention, it is possible to produce a negative electrode active material by mixing Si and components configuring a matrix, melting the mixture by an arc melting method, and the like, and applying a single roll rapid solidification method which injects the melted material to a rotating copper roll. However, the method applied in the present invention is not limited to the foregoing method, and in addition to the single roll rapid solidification method, the negative electrode active material may be produced by the fine powder producing method (a gas atomizer method, a centrifugal gas atomizer method, a plasma atomizer method, a rotating electrode method, a mechanical alloying method, and the like) as long as the method is capable of obtaining a sufficient rapid cooling speed.

It is possible to manufacture a lithium ion secondary battery by using the negative electrode active material according to the exemplary embodiment of the present invention. The lithium ion secondary battery may be manufactured by accommodating an electrode assembly including a positive electrode, a negative electrode, and a separator interposed between the positive electrode and the negative electrode, and an electrolyte in a square or cylindrical can or a polymer pouch.

As the positive electrode, a lithiated intercalation compound may be included, and further, inorganic sulfur (S8, elemental sulfur), and a sulfur compound may also be used. As the sulfur compound, $Li_2S_n(n≥1)$, $Li_2S_n(n≥1)$ dissolved in catholyte, an organic sulfur compound, or a carbon-sulfur polymer $((C_2S_f)_n:f=2.5$ to 50, n≥2).

The kind of electrolyte included in the secondary battery is not particularly limited, and a general means publicly known in the art may be adopted. In one example of the present invention, the electrolyte may include a nonaqueous organic solvent and lithium salt. The lithium salt is dissolved in an organic solvent to act as a supply source of lithium ions, and may facilitate a movement of the lithium ions between the positive electrode and the negative electrode.

An example of the lithium salt includes a material including one kind or two or more kinds of $LiPF_6$, $LiBF_4$, $LiSbF_6$, $LiAsF_6$, $LiCF_3SO_3$, $LiN(CF_3SO_2)_3$, $Li(CF_3SO_2)_2N$, $LiC_4F_9SO_3$, $LiClO_4$, $LiAlO_4$, $LiAlCl_4$, $LiN(C_xF_{2x+1}SO_2)(C_yF_{2y+1}SO_2)$ (herein, x and y are natural numbers), LiCl, LiI, and lithium bisoxalate borate as supporting electrolytic salt. A concentration of lithium salt in the electrolyte may be changed according to use, and the lithium salt is generally used within a concentration range of 0.1 M to 2.0 M.

The organic solvent serves as a medium through which ions involving an electrochemical reaction, and examples thereof include one kind or two or more kinds among benzene, toluene, fluorobenzene, 1,2-difluorobenzene, 1,3-difluorobenzene, 1,4-difluorobenzene, 1,2,3-trifluorobenzene, 1,2,4-trifluorobenzene, chlorobenzene, 1,2-dichlorobenzene, 1,3-dichlorobenzene, 1,4-dichlorobenzene, 1,2,3-trichlorobenzene, 1,2,4-trichlorobenzene, iodobenzene, 1,2-diiodobenzene, 1,3-diiodobenzene, 1,4-diiodobenzene, 1,2,3-triiodobenzene, 1,2,4-triiodobenzene, fluorotoluene, 1,2-difluorotoluene, 1,3-difluorotoluene, 1,4-difluorotoluene, 1,2,3-trifluorotoluene, 1,2,4-trifluorotoluene, chlorotoluene, 1,2-dichlorotoluene, 1,3-dichlorotoluene, 1,4-dichlorotoluene, 1,2,3-trichlorotoluene, 1,2,4-trichlorotoluene, iodotoluene, 1,2-diiodotoluene, 1,3-diiodotoluene, 1,4-diiodotoluene, 1,2,3-triiodotoluene, 1,2,4-triiodotoluene, R—CN (herein, R is a hydrocarbon radical of a linear, branching, or ring-shaped structure of carbon number 2 to 50, and the hydrocarbon radical may include a double bond, an aromatic ring, an ether linkage, or the like), dimethylformamide, dimethylacetate, xylene, cyclohexane, tetrahydrofuran, 2-methyltetrahydrofuran, cyclohexanone, ethanol, isopropyl alcohol, dimethyl carbonate, ethylmethyl carbonate, diethyl carbonate, methylprophyl cabonate, propylene carbonate, methyl propionate, ethyl propionate, methyl acetate, ethyl acetate, propyl acetate, dimethoxyethane, 1,3-dioxolane, diglyme, tetraglyme, ethylene carbonate, propylene carbonate, γ-butyrolactone, sulfolane, valerolactone, decanolide, and mevalolactone, but the organic solvent is not limited thereto.

The secondary battery may include a separator and may further include a general element, such as a battery case including a square or cylindrical can and a pouch, or a gasket, and a particular kind of the element is not particularly limited. Further, the secondary battery of the present invention may be manufactured by a general method in a general shape in the field with the foregoing element. An example of the shape of the secondary battery of the present invention includes a container shape, a horn shape, a coin shape, and a pouch shape, but the shape of the secondary battery is not limited thereto.

Hereinafter, the Examples of the present invention and the Comparative Examples will be described. However, the Examples below are simply examples of the present invention, and the scope of the present invention is not limited by the Examples.

Experimental Example 1: Expansion Characteristic of Negative Electrode Active Material Having Three-Layer Structure Used in the Example of the Present Invention In a silicon-based negative electrode active material used in the Example of the present invention, Si has the range of 60 to 70% based on atom % (at %), and Ti and Fe have the ranges of 9 to 14%. In the meantime, the Al has the range larger than 1% and less than 20%, preferably, the range of 5 to 19%. Most preferably, the Al has the range of 10 to 19%.

Table 3 below is a table representing composition ranges of the Examples and the Comparative Examples. In the meantime, Table 4 below represents the evaluation of the silicon-based negative electrode active materials based on the compositions of Table 3, and particularly, represents 1CY-charging/discharging amount, 1CY-efficiency, 1CY-pole plate capacity, 50CY-discharging capacity, 50CY-efficiency, 50CY-capacity maintenance rate, 50CY-expansion rate, and an amorphization degree (%) of the Examples and the Comparative Examples. The technical meaning of each item of Table 3 will be described in detail below.

Each item of the silicon-based negative electrode active materials used in the Examples of the present invention was measured by repeating the charging/discharging 50 times. The charging/discharging was performed in accordance with a charging/discharging method for an active material for a lithium secondary battery generally publicly known in the art.

First, in Examples 1 to 5, Al has a composition in the range of 5 to 19% based on at %, and Comparative Example 1 represents the case where Al is not added, and Comparative Example 2 represents the case where Al is added by 1%. Comparative Example 3 represents the case where Al is added by 20%.

In the meantime, Ti and Fe are bonded to Si to form an intermetallic compound of $Si_2TiFe$. Accordingly, when each of the contents of Ti and Fe is large, Si is consumed for forming the intermetallic compound, so that a capacity per g of the active material is decreased, and in this case, in order to obtain a capacity of 1,000 mAh/g or more, the content of Si added needs to be very large. In general, when the large amount of Si that is a semimetal is contained, viscosity of a molten metal is high during melting to degrade rapid solidification workability, so that it is preferable that the amount of Si contained is maintained in the range of 70% or less. Accordingly, it is preferable that the contents of Ti and Fe do not exceed 14% in consideration of the forming of the intermetallic compound with Si.

Referring to Tables 3 and 4 below, it was derived that it is preferable to decrease the contents of Ti and Fe to 14% or less in relation to the expansion rate during the process of deriving the optimum alloy components.

In addition, it is preferable that Al has the range larger than 1% and less than 20% based on at %. When Al is contained by about 1%, the active material is excessively expanded after 50 cycles, and in this case, the active material is scattered, so that Al of about 1% is not preferable. Further, when Al is contained by 20%, a discharging capacity by a change in a volume fraction of Si: Matrix is sharply decreased, so that Al of 20% is not preferable. In the Example of the present invention, it was derived that when Al has the range of 5 to 19% based on at %, it is possible to obtain the most preferable range of the expansion rate, and it could be seen that within the range, a discharging capacity is not decreased. It is most preferable that Al is 10 to 19%, and in this range, it is possible to obtain the most preferable range of the expansion rate after 50 cycles, and a discharging capacity is not decreased.

Referring to Table 4 below, in Examples 1 to 5, it can be seen that when Al is added, performance of the active material is improved. Particularly, it can be seen that when Al is added, a discharging capacity, reversible efficiency, and an expansion characteristic are considerably improved. However, in Comparative Example 1, in which Al is not added, an expansion characteristic after 50 cycles represents a value exceeding 200%. Further, in Comparative Example 2, in which Al is added by 1%, an expansion characteristic after 50 cycles also exceeds 200%. In the meantime, in Comparative Example 3, in which Al is added by 20%, an expansion characteristic after 50 cycles represents 40.2% which is very low, but in this case, a discharging capacity is considerably decreased, so that there is a problem in that an effect of improving performance of the negative electrode active material for the secondary battery is rather degraded.

Accordingly, referring to Tables 3 and 4, it can be seen that the discharging capacity, the reversible efficiency, and the expansion characteristic of the negative electrode active material are considerably improved by the addition of Al. Further, the amount of Al added exceeds at least 1% based on at %, and it can be seen that when the amount of Al added is less than 20%, the negative electrode active material exhibits the optimum performance. Further, in Comparative Examples 1 and 2, an amorphization degree (%) is less than 25%, and thus, in the Example of the present invention, it can be seen that a preferable amorphization degree within the component range of Al is at least 25% or more.

TABLE 3

| Category | Si (at %) | Ti (at %) | Fe (at %) | Al (at %) |
| --- | --- | --- | --- | --- |
| Comparative Example 1 | 70 | 15 | 15 | 0 |
| Comparative Example 2 | 70 | 14.5 | 14.5 | 1 |

TABLE 3-continued

| Category | Si (at %) | Ti (at %) | Fe (at %) | Al (at %) |
|---|---|---|---|---|
| Example 1 | 70 | 12.5 | 12.5 | 5 |
| Example 2 | 70 | 11.5 | 11.5 | 7 |
| Example 3 | 70 | 10 | 10 | 20 |
| Example 4 | 68 | 9 | 9 | 14 |
| Example 5 | 65 | 10 | 10 | 15 |
| Comparative Example 3 | 60 | 10 | 10 | 20 |

TABLE 4

| Category | 1CY-charging | 1CY-discharging | 1CY-efficiency | 1CY-Pole plate | 50CY-discharging | 50CY-efficiency | 50CY-maintenance | 50CY-expansion | Amorphization degree (%) |
|---|---|---|---|---|---|---|---|---|---|
| Comparative Example 1 | 1134.0 | 924.2 | 81.5% | 800.4 | 871.2 | 98.4% | 101.6% | 210.0% | 24.5 |
| Comparative Example 2 | 1277.2 | 1072.3 | 83.9% | 928.6 | 1012.1 | 98.8% | 96.1% | 208.3% | 24.7 |
| Example 1 | 1299.9 | 1085.2 | 83.5% | 939.8 | 948.7 | 99.1% | 91.8% | 147.9% | 29.2 |
| Example 2 | 1405.6 | 1212.5 | 86.3% | 1050.0 | 1125.1 | 99.5% | 97.1% | 96.2% | 41.1 |
| Example 3 | 1336.5 | 1133.2 | 84.7% | 981.3 | 1038.7 | 99.3% | 97.2% | 120.0% | 45.5 |
| Example 4 | 1752.3 | 1535.8 | 87.6% | 1330.0 | 1216.5 | 99.3% | 88.7% | 93.8% | 35.1 |
| Example 5 | 1189.4 | 988.0 | 83.0% | 855.6 | 977.2 | 100.5% | 113.2% | 78.1% | 45.3 |
| Comparative Example 3 | 614.2 | 432.8 | 70.3% | 374.8 | 597.7 | 100.5% | 164.1% | 40.2% | 46.5 |

First, the silicon-based negative electrode active material used in the Example of the present invention was evaluated by manufacturing a pole plate having a composition described below.

The negative electrode active material formed of a silicon alloy was evaluated by manufacturing a pole plate having a composition in which a ratio of conductive additive (carbon black series):binder (organic series, PAI binder) is 86.6%: 3.4%:10%, and a slurry dispersed in an NMP solvent was prepared, a copper foil current collector was coated with the slurry by a doctor blade method, and then the copper foil current collector was dried in an oven of 110° C., and the binder was hardened through a heat treatment for one hour at 210° C. and an Ar atmosphere.

A coin cell was manufactured with the negative electrode plate manufactured by the foregoing method with a lithium metal as an opposite pole, a Solid Electrolyte Interface (SEI) film was formed by performing a forming process under the condition described below, and subsequently, a cycle test (life test) was performed by using the charging/discharging condition below.

(Forming Process Condition)
Charging (lithium insertion): 0.1 C, 0.005 V, 0.05 C cut-off
Discharging (lithium discharging): 0.1 C, 1.5 V cut-off
(Cycle Test Condition)
Charging: 0.5 C, 0.01 V, 0.05 C cut-off
Discharging: 0.5 C, 1.0 V cut-off In Table 4, 1CY-charging (mAh/g) is a forming charging capacity per 1 g of an active material, and is a value obtained by measuring the amount of charges in a charging step in the forming process that is the first charging step after the coin cell is assembled and dividing the measured amount of charges by weight of the active material included in the pole plate of the coin cell.

1CY-discharging (mAh/g) is a forming discharging capacity per 1 g of an active material, and is a value obtained by measuring the amount of charges in a discharging step in the forming process that is the first discharging step after the coin cell is assembled and dividing the measured amount of charges by weight of the active material included in the pole plate of the coin cell. In the present Examples, the capacity per g means a forming discharging capacity of 0.1 C that is the discharging capacity measured at the time of the discharging.

1CY-efficiency is a value (%) obtained by dividing the discharging capacity by the charging capacity in the forming process that is the first charging/discharging process. In general, graphite has high initial efficiency of 94%, the silicon alloy has initial efficiency of 80 to 90%, and a silicon oxide (SiOx) has an initial efficiency value up to 70%.

The reason why the initial efficiency is less than 100% for any substance is that the lithium initially charged at the time of charging during the forming process is irreversibly trapped or consumed due to a side reaction by the formation of SEI, and when the initial efficiency is low, the negative electrode active material and a positive electrode active material need to be additionally inserted as much as the consumed amount, so that it is preferable to design a secondary battery so as to have high initial efficiency.

The silicon alloy forming the negative electrode active material used in the Example of the present invention has the initial efficiency value of 85%, and the conductive additive and the binder also irreversibly consume lithium at an initial stage, so that the initial efficiency value of the active material itself is substantially about 90%.

50CY-discharging is a discharging capacity per g of the active material at the fiftieth cycle, and a value obtained by dividing the amount of charges measured at the time of the discharging at the fiftieth cycle including the forming process in the cycle test progressed with 0.5 C after the forming process by weight of the active material. When the active material is degraded during the progress of the cycle test, 50CY-discharging is represented with a smaller value than that of the initial discharging capacity, and when there is little degradation, 50CY-discharging is represented with a similar value to that of the initial discharging capacity.

50CY-efficiency is a ratio (%) of the amount of discharging to the amount of charging at 50 cycles. As 50CY-efficiency is higher, a loss of lithium due to the side reaction and other degradations at the corresponding cycle is smaller. In general, when 50CY-efficiency is 99.5% or more, 50CY-efficiency is determined to have a very preferable value, and the dispersion of the coin cell assembly in the laboratory environment cannot be ignored, so that even when 50CY-efficiency is 98% or more, 50CY-efficiency is determined to have a preferable value.

50CY-maintenance is a ratio (%) of a discharging capacity at the fiftieth cycle to a discharging capacity at the first cycle when the subsequent 0.5 C cycle is performed, except for the cycle progressed at the time of the forming process.

As the 50CY-maintenance ratio is higher, the battery life slope is considered to be close to horizontal, and the case where the 50CY-maintenance ratio is 90% or less means that the degradation is generated during the progress of the cycle and a discharging capacity is decreased. In some Examples, the 50CY-maintenance ratio is larger than 100%, and it is determined that in this case, the degradation is rarely generated during the progress of the cycle test (life test) and simultaneously, there appears additionally activated silicon particles.

50CY-expansion represents a ratio (thickness increase value) of a thickness of the pole plate after 50 cycles to an initial thickness of the pole plate. A method of measuring 50CY-expansion will be described in detail below.

First, a thickness of an initial current collector (for example, a copper foil) before the negative electrode active material is coated is measured.

Then, a thickness of the negative electrode plate (the current collector coated with the negative electrode active material), which is in a cut state in a circular shape to be assembled to the coin cell, is measured by using a micrometer, and a thickness of only the negative electrode active material is calculated by subtracting a thickness of the current collector from the measured thickness of the negative electrode plate.

Next, after the completion of the 50 cycle test, the coin cell is removed from a dry room, only the negative electrode plate is separately separated, and then the electrolyte remaining on the negative electrode plate is washed by using a DEC solution and is dried to measure a thickness of the negative electrode plate by using the micrometer, and a thickness of only the negative electrode active material after 50 cycles is calculated by subtracting the thickness of the current collector from the measured thickness. That is, a value obtained by dividing a thickness of the negative electrode active material increased after 50 cycles by the initial thickness of the negative electrode active material increased after 50 cycles and expressed as a percentage is 50CY-expansion.

Experimental Example 2: Si, Ti, Fe, and Al Alloy

FIG. 8 is a diagram illustrating an XRD pattern after performing a post heat treatment on Example 1 which uses a Si, Ti, Fe, and Al alloy as an exemplary embodiment of the present invention, and FIG. 9 is a TEM picture of a material related to Example 1 of FIG. 8.

Referring to FIG. 8, FIG. 8 illustrates an XRD pattern after performing a post heat treatment on Example 1, and it can be seen that the XRD pattern is similar to that of the case where the active material is slowly cooled illustrated in FIG. 6B. In FIG. 8, the XRD pattern of the silicon alloy represents peaks formed of a Si main phase that is Si crystalline and a matrix phase existing on a periphery of the Si main phase, and represents the FCC structure for the matrix phase as a result of the TEM diffraction analysis of the matrix phase, and a lattice parameter a is 11.50 Å, and a lattice mismatch ratio with silicon is 5.8%. The post heat treatment may be performed at 500° C. to 800° C. for 40 minutes to 80 minutes, and preferably, may be performed at 600° C. to 800° C. for 60 minutes.

FIG. 9 is a TEM picture of the material related to Example 1 of FIG. 8 at the time of the rapid solidification. As illustrated in FIG. 9, referring to the TEM picture of the silicon-based negative electrode active material of the present invention, it can be seen that the negative electrode active material has a three-layer structure including a Si main phase formed of crystalline silicon, an amorphous matrix layer on the periphery of the Si main phase, and a K phase that is a nano grain matrix layer formed in an interface between the Si main phase and the amorphous matrix layer.

Referring to FIG. 9, investigating a point at which the three phases meet in a state diagram in detail, crystal lattice pattern is represented in all of the three phases. That is, one of the three crystalline phases is the Si main phase and at least another one is the matrix phase. The matrix is amorphous as the result of the analysis of the XRD pattern, but investigating the interface in the TEM in detail, the nano grain matrix crystalline phase is shown, so that it can be seen that the negative electrode active material has the three-layer structure.

Experimental Example 3: Characteristic of Negative Electrode Active Material of $Si_{70}Ti_{15}Fe_{15}$ In the meantime, Experimental Example 3 is the negative electrode active material of $Si_{70}Ti_{15}Fe_{15}$, and in the present negative electrode active material, the matrix does not represent a cubic structure and has a crystalline structure. Accordingly, after 50 cycles, the scattering phenomenon is generated a lot. The reason for this is that the crystal structure of the matrix is different and the matrix itself exhibits crystalline.

FIG. 10A illustrates an XRD peak characteristic and a negative electrode active material before a life test of Experimental Example 3, and FIG. 10B is a diagram illustrating a considerable decrease in a discharging capacity due to a scattering phenomenon after 50 cycles.

According to the XRD peak characteristic illustrated in FIG. 10A, it shows well that $TiFeSi_2$ that is the matrix phase is crystalline, and FIG. 10B shows that the initial capacity of 1,000 mAh/g is decreased to 800 mAh/g only after 50 cycles during the progress of the cycle. In addition, the SEM pictures of FIGS. 10A and 10B illustrate a cross-section of the expanded pole plate, in which a bright region is the matrix and a dark region is a region in which Si+Li electrolyte side reaction product is mixed.

Experimental Example 4: Characteristic of Negative Electrode Active Material of $Si_{60}(Cu_{20}Al_{80})_{30}Fe_5Ti_5$ Experimental Example 4 is a negative electrode active material of $Si_{60}(Cu_{20}Al_{80})_{30}Fe_5Ti_5$, and in the present negative electrode active material, a matrix is amorphous according to the XRD characteristic. However, a life characteristic is relatively good, but a scattering phenomenon is also generated after 50 cycles. The reason for this is that a crystal structure and a lattice parameter of the matrix are considerably different from those of the silicon crystal.

FIGS. 11A and 11B are diagrams illustrating a decrease in a capacity due to a scattering phenomenon after 50 cycles in Experimental Example 4.

FIG. 11A illustrates an XRD peak characteristic and the negative electrode active material before the life test in Experimental Example 4, and illustrates the case where the negative electrode active material is slowly cooled and is rapid cooled. FIG. 11B is a SEM picture of a cross-section of a pole plate, in which an interface between silicon and the matrix is broadened and is filled with a side reaction layer material after 50 cycles, so that a matrix material is scattered and expansion is severe.

Experimental Example 5: Characteristic of Negative Electrode Active Material of $Si_{60}(Cu_{20}Al_{80})_{32.5}Fe_5Zr_{2.5}$ In the meantime, Experimental Example 5 is a negative electrode active material of $Si_{60}(Cu_{20}Al_{80})_{32.5}Fe_5Zr_{2.5}$, and in the present negative electrode active material, a matrix is also amorphous according to the XRD characteristic. However, a life characteristic is relatively good, but a scattering phenomenon is also generated after 50 cycles. The reason for this is that a crystal structure and a lattice parameter of the matrix are considerably different from those of the silicon crystal.

FIGS. 12A and 12B are diagrams illustrating a rapid decrease in a capacity due to a scattering phenomenon after 50 cycles in Experimental Example 5.

FIG. 12A illustrates an XRD peak characteristic and the negative electrode active material before the life test in Experimental Example 5, and illustrates the case where the negative electrode active material is slowly cooled and is rapid cooled. FIG. 12B illustrates that the matrix material is scattered, the expansion is severe, and a capacity is rapidly decreased after 50 cycles.

Further, in the present invention, the matrix material used in the negative electrode active material may include materials, which are not essentially the crystal having the cubic structure at a room temperature, but may be changed to the cubic structure when is amorphized by adding a third element to form a semi-coherent interface with silicon.

It will be understood by those skilled in the art that various changes in a specific form and details may be made therein without the change of the technical spirit or the essential features of the present invention. Thus, it is to be appreciated that the embodiments described above are intended to be illustrative in every sense, and not restrictive. The scope of the present invention is represented by the scope of the claims described below rather than the detailed description, and it shall be construed that all of the changes or modified forms derived from the meanings and the scope of the claims, and the equivalent concept thereof are included in the scope of the present invention.

The invention claimed is:

1. A negative electrode active material for a secondary battery, comprising:
a Si main phase formed of crystalline Si; and
a matrix coexisting with the Si main phase,
wherein at least a part of the matrix has a crystal lattice parameter which is any one among n times, 1/n time, n√2 times, n/√2 times, and n√5 times of a crystal lattice parameter of the Si main phase (n is an integer) and
wherein the crystal lattice parameter of the matrix is any one among 1 time, 2 times, ½ time, √2 time, 2√2 time, 1/√2 time, 3 times, ⅓ time, and √5 time of the crystal lattice parameter of the Si main phase.

2. A negative electrode active material for a secondary battery, comprising:
a Si main phase formed of crystalline Si; and
a matrix coexisting with the Si main phase,
wherein a lattice mismatch ratio of a crystal lattice parameter of at least a part of the matrix to a crystal lattice parameter of the Si main phase according to Formula 1 is 12% or less, Lattice mismatch ratio(%) = [Formula 1]

$$\min\left\{\frac{|n \cdot a_{Matrix} - m \cdot a_{Si}|}{m \cdot a_{Si}}, \frac{|n \cdot a_{Matrix} - \frac{1}{m}a_{Si}|}{\frac{1}{m}a_{Si}},\right.$$

$$\frac{|n \cdot a_{Matrix} - m \cdot \sqrt{2}\, a_{Si}|}{m \cdot \sqrt{2}\, a_{Si}}, \frac{|n \cdot a_{Matrix} - \frac{\sqrt{2}}{m}a_{Si}|}{\frac{\sqrt{2}}{m}a_{Si}},$$

$$\left.\frac{|n \cdot a_{Matrix} - m \cdot \sqrt{5}\, a_{Si}|}{m \cdot \sqrt{5}\, a_{Si}}, \frac{|n \cdot a_{Matrix} - \frac{\sqrt{5}}{m}a_{Si}|}{\frac{\sqrt{5}}{m}a_{Si}}\right\} \times 100$$

herein, $a_{Matrix}$ is a lattice parameter of a phase forming the matrix, $a_{Si}$ is a lattice parameter of Si, and n and m are natural numbers.

3. The negative electrode active material of claim 1, wherein a crystal system included in the matrix includes one or more among a cubic crystal system, a tetragonal crystal system, and an orthorhombic crystal system.

4. The negative electrode active material of claim 3, wherein the crystal system included in the matrix includes one or more among a Face Centered Cubic (FCC) structure, a Body Centered Cubic (BCC) structure, and a Hexagonal Close Packed (HCP) structure.

5. The negative electrode active material of claim 4, wherein in the HCP structure, a ratio of c/a is in a range of 1,470 to 1.796, and the HCP structure is regulated by the Formula below, $$a_{Matrix\_HCP} = \sqrt{2}/2 * a_{Matrix\_cubic}$$

herein, $a_{Matrix\_HCP}$ is a lattice parameter in the HCP structure included in the matrix, and $a_{Matrix\_cubic}$ is a lattice parameter in the cubic structure included in the matrix.

6. The negative electrode active material of claim 1, wherein the matrix includes an amorphous phase, and a K phase and a P phase including crystal phases having different crystal structures,
the K phase includes a nano grain structure and the P phase includes a grain structure having a larger size than a size of the K phase, and
the K phase and the P phase are cubic.

7. The negative electrode active material of claim 6, wherein the K phase has a three-layer structure including the K phase, and the P phase has a two-layer structure including the P phase, and
the three-layer structure includes the Si main phase, an amorphous phase provided on a periphery of the Si main phase, and the K phase that is the nano grain formed in at least a part of an interface between the Si main phase and the amorphous phase, and the two-layer structure includes the Si main phase that is a Si crystal having a nano size on a periphery of the P phase, in which a crystal phase of the P phase has a larger size than a size of the Si main phase.

8. The negative electrode active material of claim 7, wherein the K phase or the P phase forms a coherent or semi-coherent interface with the Si main phase.

9. The negative electrode active material of claim 6, wherein the P phase is a meta stable phase disappearing when is slowly cooled or is heat treated at a temperature of 500° C. or higher.

10. The negative electrode active material of claim 1, wherein the lattice parameter of at least a part of the matrix is obtained by the Formula below, $$a_{Matrix}[\text{Å}] = n1*(a_{Si} \pm 12\%)$$

herein, $a_{Matrix}$ is a lattice parameter of the phase forming the matrix, and $a_{Si}$ is a lattice parameter of Si, and n1 is any one among 1, 2, ½, √2, 2√2, 1/√2, 3, ⅓ and √5, when n1 is 1, $a_{Matrix}$ is 4.779 to 6.083 Å, when n1 is 2, $a_{Matrix}$ is 9.559 to 12.165 Å, when n1 is ½, $a_{Matrix}$ is 2.390 to 3.041 Å, when n1 is √2, $a_{Matrix}$ is 9.559 to 12.165 Å, when n1 is 2√2, $a_{Matrix}$ is 13.518 to 17.205 Å, when n1 is 1/√2, $a_{Matrix}$ is 3.379 to 4.301 Å, when n1 is 3, $a_{Matrix}$ is 14.338 to 18.248 Å, when n1 is ⅓, $a_{Matrix}$ is 1.593 to 2.028 Å, and when n1 is √5, $a_{Matrix}$ is 10.687 to 13.601 Å.

11. The negative electrode active material of claim 1, wherein the lattice parameter of at least a part of the matrix is obtained by the Formula below, $$a_{Matrix}[\text{Å}] = n2*(a_{Si} \pm 6\%)$$

herein, $a_{Matrix}$ is a lattice parameter of the phase forming the matrix, and $a_{Si}$ is a lattice parameter of Si, and n2 is any one among 1, 2, ½, √2, 2√2, 1/√2, 3, ⅓ and √5, when n2 is 1, $a_{Matrix}$ is 5.105 to 5.757 Å, when n2 is 2, $a_{Matrix}$ is 10.210 to 11.514 Å, when n2 is ½, $a_{Matrix}$ is 2.553 to 2.878 Å, when n2 is √2, $a_{Matrix}$ is 7.220 to 8.141 Å, when n2 is 2√2, $a_{Matrix}$ is 14.440 to 16.283 Å, when n2 is 1/√2, $a_{Matrix}$ is 3.610 to 4.071 Å, when n2 is 3, $a_{Matrix}$ is 15.315 to 17.271 Å, when n2 is ⅓, $a_{Matrix}$ is 1.702 to 1.919 Å, and when n2 is √5, $a_{Matrix}$ is 11.415 to 12.873 Å.

12. The negative electrode active material of claim 1, wherein an amorphization degree is 25% to 65%, and an XRD peak is $I_{Si}/I_{matrix} > 1$ ($I_{Si}$ is an intensity value of a maximum value among XRD peaks of a silicon phase, and $I_{matrix}$ is an intensity value of a maximum value among the remaining peaks except for the Si phase).

13. The negative electrode active material of claim 1, wherein the Si main phase is crystalline, and a length of a width of a crystal region of the Si main phase has a size of 10 nm to 200 nm when a cross-section is observed.

14. The negative electrode active material of claim 1, wherein the Si main phase has a structure which is crystalline and is connected up to a surface of an alloy, and includes a path through which Li is allowed to enter during charging/discharging.

15. The negative electrode active material of claim 1, wherein the negative electrode active material for the secondary battery is formed by a chemical formula below, and an expansion rate the negative electrode active material for the secondary battery after 50 cycles is in a range of 70 to 150%, and an amorphization degree of a fine crystal region within the matrix is 25% to 65%, $$Si_xTi_yFe_zAl_u$$

(x, y, z, and u are atom % (at %), x: 1−(y+z+u), y: 0.09 to 0.14, z: 0.09 to 0.14, u: larger than 0.01 and less than 0.2).

16. The negative electrode active material of claim 15, wherein the expansion rate of the negative electrode active material for the secondary battery after 50 cycles is 70 to 150%, and Al is in a range of 5 to 19% based on atom % (at %).

17. The negative electrode active material of claim 15, wherein in the negative electrode active material for the secondary battery, each of Ti and Fe is 9 to 12.5% based on atom % (at %).

18. A secondary battery, comprising:
a negative electrode including the negative electrode active material for the secondary battery of claim 1;
a positive electrode; and
an electrolyte,
wherein the negative electrode active material for the secondary battery includes a Si main phase formed of crystalline Si, and a matrix coexisting with the Si main phase,
the matrix includes an amorphous phase, and a K phase and a P phase including crystal phases having different crystal structures, in which the K phase has a three-layer structure including the K phase, and the P phase has a two-layer structure including the P phase, and
the three-layer structure includes the Si main phase, an amorphous phase provided on the periphery of the Si main phase, and the K phase that is the nano grain formed in at least a part of an interface between the Si main phase and the amorphous phase, and in the two-layer structure, the Si main phase that is a Si crystal having a nano size is provided on the periphery of the P phase having a grain structure having a larger size than a size of the K phase.

19. The secondary battery of claim 18, wherein the negative electrode is formed of the negative electrode active material, of which an expansion rate after 50 cycles is 70 to 150%, an amorphization degree in an alloy formed by a chemical formula below is 25 to 65%, and Si is in the range of 60 to 70%, Ti is in the range of 9 to 14%, Fe is in the range of 9 to 14%, and Al is in the range of 5 to 19% based on atom % (at %), $$Si_xTi_yFe_zAl_u \qquad \text{[Formula]}$$

(x, y, z, and u are atom % (at %), x: 1−(y+z+u), y: 0.09 to 0.14, z: 0.09 to 0.14, u: 0.05 to 0.19).

* * * * *